(12) United States Patent
Matsumura et al.

(10) Patent No.: US 11,283,482 B2
(45) Date of Patent: Mar. 22, 2022

(54) TERMINAL AND BASE STATION

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 0 days.

(21) Appl. No.: 17/045,044

(22) PCT Filed: Apr. 5, 2018

(86) PCT No.: PCT/JP2018/014648
§ 371 (c)(1),
(2) Date: Oct. 2, 2020

(87) PCT Pub. No.: WO2019/193737
PCT Pub. Date: Oct. 10, 2019

(65) Prior Publication Data
US 2021/0152211 A1 May 20, 2021

(51) Int. Cl.
*H04B 1/713* (2011.01)
*H04W 88/02* (2009.01)
(52) U.S. Cl.
CPC .......... *H04B 1/713* (2013.01); *H04W 88/02* (2013.01)
(58) Field of Classification Search
CPC ..... H04B 1/713; H04B 1/7143; H04W 88/02; H04L 5/0091; H04L 5/0012; H04L 5/0016; H04L 5/0053
See application file for complete search history.

(56) References Cited

U.S. PATENT DOCUMENTS

| | | | | |
|---|---|---|---|---|
| 2013/0121280 A1* | 5/2013 | Ouchi | ............... | H04L 5/0048 370/329 |
| 2019/0261356 A1* | 8/2019 | Myung | ............... | H04W 72/02 |
| 2021/0195586 A1* | 6/2021 | Kim | ............... | H04L 5/0091 |

OTHER PUBLICATIONS

International Search Report issued in Application No. PCT/JP2018/014648, dated Jun. 26, 2018 (5 pages).
Written Opinion issued in International Application No. PCT/JP2018/014648, dated Jun. 26, 2018 (4 pages).
(Continued)

*Primary Examiner* — Vineeta S Panwalkar
(74) *Attorney, Agent, or Firm* — Osha Bergman Watanabe & Burton LLP

(57) ABSTRACT

A terminal is disclosed including a receiver that receives a system information including an index; and a processor that determines a parameter set corresponding to a value of the index from a plurality of cell-specific parameter sets for a physical uplink control channel (PUCCH) before radio resource control (RRC) connection, and determines an initial cyclic shift index from the determined parameter set based on a physical downlink control channel (PDCCH), wherein the plurality of cell-specific parameter sets includes a first parameter set having an initial cyclic shift index set {0,3} for PUCCH format 0, and a second parameter set having an initial cyclic index set {0,6} for PUCCH format 1. In another aspect, a base station is also disclosed.

12 Claims, 23 Drawing Sheets

(56) References Cited

OTHER PUBLICATIONS

3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
3GPP TSG RAN WG1 Meeting #92; R1-1802213; "Remaining issues on PUCCH resource allocation;" LG Electronics Feb. 26-Mar. 2, 2018; Athens, Greece (6 pages).
3GPP TSG RAN WG1 Meeting #92; R1-1802909; "On PUCCH Resource Allocation before RRC Connection;" Ericsson; Feb. 26-Mar. 2, 2018; Athens, Greece (5 pages).
Extended European Search Report issued in Application No. 18913612.0 dated Oct. 18, 2021 (9 pages).
Motorola Mobility, Lenovo "PUCCH resource allocation" 3GPP TSG RAN WG1 #91, R1-1720926, Reno, USA, Nov. 27-Dec. 1, 2017 (10 pages).
Huawei, HiSilicon, "Summary of remaining issues on resource allocation for PUCCH" 3GPP TSG RAN WG1 Ad Hoc Meeting, R1-1800074, Vancouver, Canada, Jan. 22-26, 2018 (4 pages).
OPPO, "Summary of offline discussions on PUCCH resource allocation" 3GPP TSG RAN WG1 Meeting AH 1801, R1-1801087, Vancouver, Canada, Jan. 22-26, 2018, (9 pages).

* cited by examiner

FIG. 1

| INDEX i IN RMSI | PUCCH PERIOD | CELL-SPECIFIC PRB OFFSET |
|---|---|---|
| 0 | 2 SYMBOLS | 0 |
| 1 | 2 SYMBOLS | 1 |
| 2 | 2 SYMBOLS | 2 |
| 3 | 2 SYMBOLS | 3 |
| 4 | 4 SYMBOLS | 0 |
| 5 | 4 SYMBOLS | 1 |
| 6 | 4 SYMBOLS | 2 |
| 7 | 4 SYMBOLS | 3 |
| 8 | 10 SYMBOLS | 0 |
| 9 | 10 SYMBOLS | 1 |
| 10 | 10 SYMBOLS | 2 |
| 11 | 10 SYMBOLS | 3 |
| 12 | 14 SYMBOLS | 0 |
| 13 | 14 SYMBOLS | 1 |
| 14 | 14 SYMBOLS | 2 |
| 15 | 14 SYMBOLS | 3 |

FIG. 2A

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 3 |
| 001 | 1 | 1 | 0 | 3 |
| 010 | 1 | 2 | 0 | 3 |
| 011 | 1 | 3 | 0 | 3 |
| 100 | 2 | 0 | 0 | 3 |
| 101 | 2 | 1 | 0 | 3 |
| 110 | 2 | 2 | 0 | 3 |
| 111 | 2 | 3 | 0 | 3 |

FIG. 2B

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 3 |
| 001 | 1 | 0 | 6 | 9 |
| 010 | 1 | 1 | 0 | 3 |
| 011 | 1 | 1 | 6 | 9 |
| 100 | 2 | 0 | 0 | 3 |
| 101 | 2 | 0 | 6 | 9 |
| 110 | 2 | 1 | 0 | 3 |
| 111 | 2 | 1 | 6 | 9 |

FIG. 3

| RMSI INDEX | PUCCH PERIOD | CELL-SPECIFIC PRB OFFSET |
|---|---|---|
| 0 | 2 SYMBOLS | 0 |
| 1 | 2 SYMBOLS | floor((Initial_BWP/2) * (1/4)) |
| 2 | 2 SYMBOLS | floor((Initial_BWP/2) * (2/4)) |
| 3 | 2 SYMBOLS | floor((Initial_BWP/2) * (3/4)) |
| 4 | 4 SYMBOLS | 0 |
| 5 | 4 SYMBOLS | floor((Initial_BWP/2) * (1/4)) |
| 6 | 4 SYMBOLS | floor((Initial_BWP/2) * (2/4)) |
| 7 | 4 SYMBOLS | floor((Initial_BWP/2) * (3/4)) |
| 8 | 10 SYMBOLS | 0 |
| 9 | 10 SYMBOLS | floor((Initial_BWP/2) * (1/4)) |
| 10 | 10 SYMBOLS | floor((Initial_BWP/2) * (2/4)) |
| 11 | 10 SYMBOLS | floor((Initial_BWP/2) * (3/4)) |
| 12 | 14 SYMBOLS | 0 |
| 13 | 14 SYMBOLS | floor((Initial_BWP/2) * (1/4)) |
| 14 | 14 SYMBOLS | floor((Initial_BWP/2) * (2/4)) |
| 15 | 14 SYMBOLS | floor((Initial_BWP/2) * (3/4)) |

| RMSI INDEX | PUCCH PERIOD | CELL-SPECIFIC PRB OFFSET |
|---|---|---|
| 0 | 2 SYMBOLS | 0 |
| 1 | | floor((INITIAL BWP/2)*(1/2)) |
| 2 | 4 SYMBOLS | 0 |
| 3 | | floor((INITIAL BWP/2)*(1/2)) |
| 4 | 10 SYMBOLS | 0 |
| 5 | | floor((INITIAL BWP/2)*(1/2)) |
| 6 | 14 SYMBOLS | 0 |
| 7 | | floor((INITIAL BWP/2)*(1/2)) |

FIG. 8

| INDEX i IN RMSI | PUCCH PERIOD | CELL-SPECIFIC PRB OFFSET |
|---|---|---|
| 0 | 2 SYMBOLS | 0 |
| 1 | | floor((INITIAL BWP/2)*(1/2)) |
| 2 | 4 SYMBOLS | 0 |
| 3 | | floor((INITIAL BWP/2)*(1/2)) |
| 4 | 10 SYMBOLS | 0 |
| 5 | | floor((INITIAL BWP/2)*(1/4)) |
| 6 | | floor((INITIAL BWP/2)*(2/4)) |
| 7 | | floor((INITIAL BWP/2)*(3/4)) |
| 8 | 14 SYMBOLS | 0 |
| 9 | | floor((INITIAL BWP/2)*(1/4)) |
| 10 | | floor((INITIAL BWP/2)*(2/4)) |
| 11 | | floor((INITIAL BWP/2)*(3/4)) |

FIG. 9

FIG. 10A  TABLE FOR PF 0

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 3 |
| 001 | 1 | 1 | 0 | 3 |
| 010 | 1 | 2 | 0 | 3 |
| 011 | 1 | 3 | 0 | 3 |
| 100 | 2 | 0 | 0 | 3 |
| 101 | 2 | 1 | 0 | 3 |
| 110 | 2 | 2 | 0 | 3 |
| 111 | 2 | 3 | 0 | 3 |

FIG. 10B  TABLE FOR PF 1

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | 6 |
| 001 | 1 | 1 | 0 | 6 |
| 010 | 1 | 2 | 0 | 6 |
| 011 | 1 | 3 | 0 | 6 |
| 100 | 2 | 0 | 0 | 6 |
| 101 | 2 | 1 | 0 | 6 |
| 110 | 2 | 2 | 0 | 6 |
| 111 | 2 | 3 | 0 | 6 |

FIG. 11

| ARI | HOPPING DIRECTION | UE-SPECIFIC PRB OFFSET | INITIAL CS INDEX | |
|---|---|---|---|---|
| | | | r=0 | r=1 |
| 000 | 1 | 0 | 0 | $a_1$ |
| 001 | | 1 | 0 | $a_1$ |
| 010 | | 2 | 0 | $a_1$ |
| 011 | | 3 | 0 | $a_1$ |
| 100 | 2 | 0 | 0 | $a_1$ |
| 101 | | 1 | 0 | $a_1$ |
| 110 | | 2 | 0 | $a_1$ |
| 111 | | 3 | 0 | $a_1$ |

FIG. 12

| RMSI INDEX | PUCCH PERIOD | FREQUENCY HOPPING | CELL-SPECIFIC PRB OFFSET |
|---|---|---|---|
| 0 | 2 SYMBOLS | ENABLED | 0 |
| 1 | | | floor((Initial_BWP/2) * (1/4)) |
| 2 | | | floor((Initial_BWP/2) * (2/4)) |
| 3 | | | floor((Initial_BWP/2) * (3/4)) |
| 4 | 4 SYMBOLS | ENABLED | 0 |
| 5 | | | floor((Initial_BWP/2) * (1/4)) |
| 6 | | | floor((Initial_BWP/2) * (2/4)) |
| 7 | | | floor((Initial_BWP/2) * (3/4)) |
| 8 | 10 SYMBOLS | ENABLED | 0 |
| 9 | | | floor((Initial_BWP/2) * (1/4)) |
| 10 | | | floor((Initial_BWP/2) * (2/4)) |
| 11 | | | floor((Initial_BWP/2) * (3/4)) |
| 12 | 14 SYMBOLS | ENABLED | 0 |
| 13 | | | floor((Initial_BWP/2) * (1/4)) |
| 14 | | | floor((Initial_BWP/2) * (2/4)) |
| 15 | | | floor((Initial_BWP/2) * (3/4)) |

FIG. 13

| RMSI INDEX | PUCCH PERIOD | FREQUENCY HOPPING | CELL-SPECIFIC PRB OFFSET |
|---|---|---|---|
| 0 | 2 SYMBOLS | DISABLED | 0 |
| 1 | | | floor((Initial_BWP/2) * (1/4)) |
| 2 | | | floor((Initial_BWP/2) * (2/4)) |
| 3 | | | floor((Initial_BWP/2) * (3/4)) |
| 4 | 4 SYMBOLS | DISABLED | 0 |
| 5 | | | floor((Initial_BWP/2) * (1/4)) |
| 6 | | | floor((Initial_BWP/2) * (2/4)) |
| 7 | | | floor((Initial_BWP/2) * (3/4)) |
| 8 | 10 SYMBOLS | DISABLED | 0 |
| 9 | | | floor((Initial_BWP/2) * (1/4)) |
| 10 | | | floor((Initial_BWP/2) * (2/4)) |
| 11 | | | floor((Initial_BWP/2) * (3/4)) |
| 12 | 14 SYMBOLS | DISABLED | 0 |
| 13 | | | floor((Initial_BWP/2) * (1/4)) |
| 14 | | | floor((Initial_BWP/2) * (2/4)) |
| 15 | | | floor((Initial_BWP/2) * (3/4)) |

FIG. 14

| RMSI INDEX | PUCCH PERIOD | FREQUENCY HOPPING | CELL-SPECIFIC PRB OFFSET |
|---|---|---|---|
| 0 | 2 SYMBOLS | DISABLED | 0 |
| 1 | | | floor((Initial_BWP/2) * (1/4)) |
| 2 | | | floor((Initial_BWP/2) * (2/4)) |
| 3 | | | floor((Initial_BWP/2) * (3/4)) |
| 4 | 4 SYMBOLS | ENABLED | 0 |
| 5 | | | floor((Initial_BWP/2) * (1/4)) |
| 6 | | | floor((Initial_BWP/2) * (2/4)) |
| 7 | | | floor((Initial_BWP/2) * (3/4)) |
| 8 | 10 SYMBOLS | ENABLED | 0 |
| 9 | | | floor((Initial_BWP/2) * (1/4)) |
| 10 | | | floor((Initial_BWP/2) * (2/4)) |
| 11 | | | floor((Initial_BWP/2) * (3/4)) |
| 12 | 14 SYMBOLS | ENABLED | 0 |
| 13 | | | floor((Initial_BWP/2) * (1/4)) |
| 14 | | | floor((Initial_BWP/2) * (2/4)) |
| 15 | | | floor((Initial_BWP/2) * (3/4)) |

FIG. 15

| PUCCH PERIOD | $N_{SF}$ | | |
|---|---|---|---|
| | NO INTRA-SLOT HOPPING<br>m'=0 | INTRA-SLOT HOPPING | |
| | | m'=0 | m'=1 |
| 4 | 2 | 1 | 1 |
| 5 | 2 | 1 | 1 |
| 6 | 3 | 1 | 2 |
| 7 | 3 | 1 | 2 |
| 8 | 4 | 2 | 2 |
| 9 | 4 | 2 | 2 |
| 10 | 5 | 2 | 3 |
| 11 | 5 | 2 | 3 |
| 12 | 6 | 3 | 3 |
| 13 | 6 | 3 | 3 |
| 14 | 7 | 3 | 4 |

FIG. 16

| $N_{SF}$ | \phi 0 | 1 | 2 | 3 | 4 | 5 | 6 |
|---|---|---|---|---|---|---|---|
| 2 | [0 0] | [0 1] | - | - | - | - | - |
| 3 | [0 0 0] | [0 1 2] | [0 2 1] | - | - | - | - |
| 4 | [0 0 0 0] | [0 2 0 2] | [0 0 2 2] | [0 2 2 0] | - | - | - |
| 5 | [0 0 0 0 0] | [0 1 2 3 4] | [0 2 4 1 3] | [0 3 1 4 2] | [0 4 3 2 1] | - | - |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | - |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

FIG. 17

| ARI | HOPPING DIRECTION | UE-SPECIFIC PRB OFFSET | r=0 | | r=1 | |
|---|---|---|---|---|---|---|
| | | | INITIAL CS INDEX | ORTHOGONAL SEQUENCE INDEX | INITIAL CS INDEX | ORTHOGONAL SEQUENCE INDEX |
| 000 | 1 | 0 | 0 | 0 | $a_1$ | $s_1$ |
| 001 | 1 | 1 | 0 | 0 | $a_1$ | $s_1$ |
| 010 | 1 | 2 | 0 | 0 | $a_1$ | $s_1$ |
| 011 | 1 | 3 | 0 | 0 | $a_1$ | $s_1$ |
| 100 | 2 | 0 | 0 | 0 | $a_1$ | $s_1$ |
| 101 | 2 | 1 | 0 | 0 | $a_1$ | $s_1$ |
| 110 | 2 | 2 | 0 | 0 | $a_1$ | $s_1$ |
| 111 | 2 | 3 | 0 | 0 | $a_1$ | $s_1$ |

TERMINAL AND BASE STATION

TECHNICAL FIELD

The present invention relates to a user terminal and a radio base station in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further widening a bandwidth and increasing the speed in comparison with LTE, the succeeding systems of LTE (which are also referred to as, for example, LTE-A (LTE-Advanced), FRA (Future Radio Access), 4G, 5G, 5G+ (plus), NR (New RAT), LTE Rel. 15 and later versions, or the like) are also under study.

In the existing LTE systems (for example, LTE Rel. 8 to Rel. 13), downlink (DL) and/or uplink (UL) communication is performed by using a subframe (also referred to as a transmission time interval (TTI) or the like) of 1 ms. The subframe is a transmission time unit of one data packet coded by channel coding, and is a processing unit of scheduling, link adaptation, retransmission control (HARQ (Hybrid Automatic Repeat reQuest)), and so on.

In the existing LTE systems (for example, LTE Rel. 8 to Rel. 13), a user terminal transmits uplink control information (UCI) by using an uplink control channel (for example, a PUCCH (Physical Uplink Control Channel)) or an uplink shared channel (for example, a PUSCH (Physical Uplink Shared Channel)). A configuration (format) of the uplink control channel is referred to as a PUCCH format or the like.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For the future radio communication systems (for example, LTE Rel. 15 or later versions, 5G, 5G+, NR and so on), a method of allocating resources for an uplink control channel (for example, PUCCH resources) used for transmission of UCI to the user terminal is under study.

For example, the following method is under study: before RRC (Radio Resource Control) connection setup, the user terminal determines PUCCH resources to be used for transmission of UCI, based on at least one of a certain field value in system information (for example, RMSI (Remaining Minimum System Information)) and a certain field value and an implicit value in downlink control information (DCI).

However, with the above method of determining PUCCH resources, PUCCH frequency resources to be used for frequency hopping within a certain bandwidth may not be appropriately determined.

The present invention is made in view of such circumstances, and has one object to provide a user terminal and a radio base station that can appropriately determine PUCCH frequency resources to be used for frequency hopping within a certain bandwidth.

Solution to Problem

One aspect of a user terminal of the present invention includes: a receiving section that receives a downlink control channel; and a control section that determines an initial cyclic shift index for an uplink control channel based on the downlink control channel, in which a difference between different initial cyclic shift indexes based on different downlink control channels is different depending on a format of the uplink control channel.

Advantageous Effects of Invention

According to the present invention, PUCCH frequency resources to be used for frequency hopping within a certain bandwidth can be appropriately determined.

BRIEF DESCRIPTION OF DRAWINGS

FIG. 1 is a diagram to show an example of PUCCH resources indicated by RMSI index values;

FIGS. 2A and 2B are each a diagram to show an example of PUCCH resources for each PUCCH format indicated by an ARI;

FIG. 3 is a diagram to show an example of an RMSI index indicating a cell-specific PRB offset of four values according to a first aspect;

FIG. 8 is a diagram to show an example of an RMSI index indicating the cell-specific PRB offset of two values according to the first aspect;

FIG. 9 is a diagram to show an example of an RMSI index indicating a cell-specific PRB offset of two values and four values according to the first aspect;

FIG. 10A and FIG. 10B are each a diagram to show an example of PUCCH resources indicated by an ARI according to a second aspect;

FIG. 11 is a diagram to show another example of PUCCH resources common to PUCCH formats indicated by the ARI according to the second aspect;

FIG. 12 is a diagram to show an example of PUCCH resources including information as to whether frequency hopping is enabled or disabled according to a third aspect;

FIG. 13 is a diagram to show an example of PUCCH resources for FR 2 according to the third aspect;

FIG. 14 is a diagram to show another example of PUCCH resources for FR 2 according to the third aspect;

FIG. 15 is a diagram to show an example of an orthogonal sequence capacity for PF 1;

FIG. 16 is a diagram to show an example of orthogonal sequences for PF 1;

FIG. 17 is a diagram to show an example of PUCCH resources indicated by an ARI according to a fourth aspect;

DESCRIPTION OF EMBODIMENTS

Figure 4A:
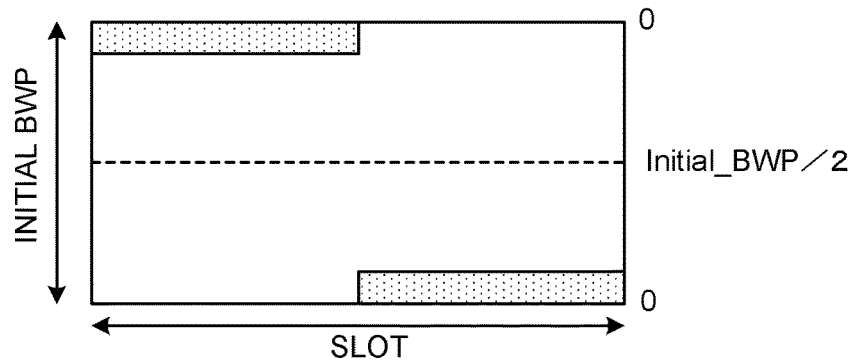
FIGS. 4A to 4D are each a diagram to show an example of frequency hopping using the cell-specific PRB offset of four values according to the first aspect.

In the future radio communication systems (for example, LTE Rel. 15 or later versions, 5G, NR, or the like), a configuration (also referred to as a format, a PUCCH format (PF), or the like) for an uplink control channel (for example, a PUCCH) used for transmission of UCI is under study. For example, in LTE Rel. 15, support of five types of PFs 0 to 4 is under study. Note that the term "PF" as used in the following description is merely an example, and a different term may be used.

For example, each of PFs 0 and 1 is a PF used for transmission of UCI of up to 2 bits (for example, transmission confirmation information (also referred to as a HARQ-ACK (Hybrid Automatic Repeat reQuest-Acknowledge), an ACK, a NACK, or the like)). PF 0 can be allocated to 1 or 2 symbols, and is therefore also referred to as a short PUCCH, a sequence-based short PUCCH, or the like. In contrast, PF 1 can be allocated to 4 to 14 symbols, and is therefore also referred to as a long PUCCH or the like. In PF 1, a plurality of user terminals may be multiplexed in code division multiplexing (CDM) within the same physical resource block (also referred to as a PRB, a resource block (RB), or the like) by means of time-domain block-wise spreading using at least one of a CS and an OCC.

Each of PFs 2 to 4 is a PF used for transmission of UCI of more than 2 bits (for example, channel state information (CSI) (or CSI and a HARQ-ACK and/or a scheduling request (SR))). PF 2 can be allocated to 1 or 2 symbols, and is therefore also referred to as a short PUCCH or the like. In contrast, each of PFs 3 and 4 can be allocated to 4 to 14 symbols, and is therefore also referred to as a long PUCCH or the like. In PF 4, a plurality of user terminals may be multiplexed in CDM by means of (frequency-domain) block-wise spreading before DFT.

Regarding resources (for example, PUCCH resources) used for transmission of an uplink control channel of the formats as described above, determination of PUCCH resources to be used for transmission of UCI, based on at least one of a certain field value in system information (for example, RMSI (Remaining Minimum System Information)) and a certain field value and an implicit value in downlink control information (DCI) before RRC connection setup is under study.

For example, before RRC connection setup, one of a plurality of PUCCH resources is specified based on a certain field value in RMSI (also referred to as an index value, an RMSI index value, a certain value, an indicator (indication), an RMSI indicator, a certain value, or the like). For example, 16 types of PUCCH resources are specified based on a 4-bit RMSI index value.

Each PUCCH resource indicated by the RMSI index value may include one or more cell-specific parameters. For example, the cell-specific parameters include at least one of the following parameters, and may include another parameter.

- Information indicating a period assigned to the PUCCH (the number of symbols, a PUCCH period), for example, information indicating any one of 2, 4, 10, and 14 symbols
- Information indicating an offset (a PRB offset, a frequency offset, a cell-specific PRB offset) used to determine frequency resources to be assigned to the PUCCH when frequency hopping is applied
- Starting symbol of the PUCCH One of a plurality of PUCCH resources is specified based on at least one of a certain field value (a PUCCH resource indicator, an ACK/NACK resource indicator (ARI), an ACK/NACK resource offset (ARO), or a TPC command field value) in DCI and an implicit value. For example, 16 PUCCH resources are specified based on a 3-bit ARI in DCI and a 1-bit implicit value.

Each PUCCH resource indicated by at least one of the ARI and the implicit value may include one or more user terminal-specific (UE-specific) parameters. For example, the UE-specific parameters include at least one of the following parameters, and may include another parameter.

- Information (hopping direction) indicating from which direction of a certain bandwidth hopping is performed, for example, information (for example, "1") indicating that a PRB of a smaller index number is assigned for the first hop and a PRB of a larger index number is for the second hop, or information (for example, "2") indicating that a PRB of a larger index number is assigned for the first hop and a PRB of a smaller index number is assigned for the second hop
- Information indicating an offset (a PRB offset, a frequency offset, a UE-specific PRB offset) used to determine frequency resources to be assigned to the PUCCH when frequency hopping is applied
- Information indicating an index of an initial cyclic shift (CS)

The implicit value may be, for example, derived based on at least one of the following parameters. Note that the implicit value may be any value derived without explicit signaling.

- Index of a control resource unit (for example, a CCE (Control Channel Element)) to which a downlink control channel (for example, a PDCCH (Physical Downlink Control Channel)) is allocated
- Aggregation level of the control resource unit FIG. 1 is a diagram to show an example of PUCCH resources indicated by the RMSI index values. For example, as shown in FIG. 1, each value of a 4-bit RMSI index may indicate a PUCCH period and a cell-specific PRB offset.

FIGS. 2A and 2B are each a diagram to show an example of PUCCH resources indicated by the ARI. FIG. 2A shows an example of PUCCH resources for PUCCH format 0, and FIG. 2B shows an example of PUCCH resources for PUCCH format 1.

For example, as shown in FIGS. 2A and 2B, a 3-bit ARI may indicate a hopping direction, a UE-specific PRB offset, and a plurality of initial CS indexes. For example, the user terminal may derive a 1-bit value r (implicit value), based on a CCE index, and may determine one of the plurality of initial CS indexes, based on the value r.

When frequency hopping is applied to the PUCCH in the future radio communication systems as described above, it is assumed that frequency resources assigned to the PUCCH are PRBs that are away from a PRB at each edge of a certain bandwidth (for example, a bandwidth part (BWP)) by a certain offset value x.

Here, the BWP is a partial band configured in a carrier, and is referred to as a partial band or the like. The BWP may include a BWP for the uplink (UL) (a UL BWP, an uplink BWP), and a BWP for the downlink (DL) (a DL BWP, a downlink BWP). An uplink BWP for random access (initial access) may be referred to as an initial BWP, an initial uplink BWP, an initial access BWP, or the like.

A downlink BWP used to detect a block including a synchronization signal and a broadcast channel (also referred to as an SSB (Synchronization Signal Block), an SS/PBCH block (Synchronization Signal/Physical Broadcast Channel Block), or the like) may be referred to as an initial downlink BWP or the like.

When one or more BWPs (at least one of one or more uplink BWPs and one or more downlink BWPs) are configured for the user terminal, at least one of the BWPs may be activated. A BWP in an active state may also be referred to as an active BWP (an active uplink BWP or an active downlink BWP) or the like. A default BWP (a default BWP (a default uplink BWP or a default downlink BWP)) may be configured for the user terminal.

For example, it is assumed that the frequency resources of the first hop include certain number of PRBs that are away from one edge of a certain bandwidth (for example, an initial access BWP) by a certain offset value x, and the frequency resources of the second hop include certain PRBs that are away from another edge of the certain bandwidth by the certain offset value x.

The certain offset value x is derived based on at least one of the cell-specific PRB offset indicated by the RMSI index value and the UE-specific PRB offset indicated by the ARI. For example, the following equation may hold: Certain offset value x=Cell-specific PRB offset+UE-specific PRB offset.

However, when the cell-specific PRB offset indicated by the RMSI index value is a fixed value (for example, any one of 0 to 3 in FIG. 1) as shown in FIG. 1, PUCCH allocation may be concentrated on both edge regions of a certain bandwidth (for example, an initial access BWP), and PUCCH frequency resources to be used for frequency hopping within the certain bandwidth may not be appropriately assigned.

In view of this, the inventors of the present invention come up with the idea of enabling appropriate determination of PUCCH frequency resources to be used for frequency hopping within a certain bandwidth, by using a value based on the certain bandwidth (for example, an initial access BWP) for the cell-specific PRB offset value, instead of using a fixed value. The inventors of the present invention come up with the idea of causing a difference between different initial CS indexes based on the PDCCH to be different depending on a PUCCH format.

The present embodiment will be described below in detail.

In the present embodiment, the user terminal receives system information including a value based on a certain bandwidth or an index value indicating a cell-specific PRB offset (first offset value) being 0. Based on the cell-specific PRB offset, the user terminal determines PUCCH frequency resources to be used for frequency hopping within the certain bandwidth.

The following description is based on an assumption that the certain bandwidth is an initial access BWP. The certain bandwidth, however, is not limited to this, and may be another bandwidth such as an uplink BWP or a downlink BWP.

The following description is also based on an assumption that the system information including an index value indicating a cell-specific PRB offset value is RMSI. The system information, however, may be any type of information as long as the information is information broadcast in a certain unit (for example, a cell unit, a component carrier unit, or a carrier unit). The index value indicating a cell-specific PRB offset in RMSI is hereinafter also referred to as an RMSI index value.

(First Aspect)

In the first aspect, the cell-specific PRB offset indicated by the RMSI index value will be described. The cell-specific PRB offset may have four values or two values including at least one of a value based on an initial access BWP and 0.

<Cell-Specific PRB Offset of Four Values>

FIG. 3 is a diagram to show an example of the RMSI index values indicating a cell-specific PRB offset of four values according to the first aspect. As shown in FIG. 3, each PUCCH period may be associated with a cell-specific PRB offset of four values, and the cell-specific PRB offset of four values may be indicated by respective four different RMSI indexes. For example, in FIG. 3, each of four PUCCH periods of 2, 4, 10, and 14 symbols is associated with a cell-specific PRB offset of four values.

In FIG. 3, as the cell-specific PRB offset, four values {0, floor((Initial_BWP/2)*(1/4)), floor((Initial_BWP/2)*(2/4)), floor((Initial_BWP/2)*(3/4))} are indicated. Here, Initial_BWP may be the number of PRBs constituting the initial access BWP.

FIGS. 4A to 4D are each a diagram to show an example of frequency hopping using the cell-specific PRB offset of four values according to the first aspect. FIGS. 4A, 4B, 4C, and 4D show examples of frequency hopping when the RMSI index value of FIG. 3 is 12, 13, 14, and 15, respectively, (in other words, when the PUCCH period is 14 symbols). Note that frequency hopping illustrated in the following description is merely examples, and frequency hopping is not limited to such illustrated examples. For example, the PUCCH period may be configured by a part of the symbols (for example, 2, 4, or 10 symbols) of a slot.

Note that, in FIGS. 4A to 4D, the UE-specific PRB offset specified by the ARI in DCI is 0, or the UE-specific PRB offset is not used. FIGS. 4A to 4D assume a case that the number of PRBs constituting the initial access BWP is an even number, but this is not restrictive. The number of PRBs constituting the initial access BWP may be an odd number, and patterns of frequency hopping are not limited to the illustrated patterns.

As shown in FIG. 4A, when the cell-specific PRB offset indicated by the RMSI index value is "0", the user terminal may determine the use of a certain number of PRBs at both the edges of the initial access BWP for PUCCH frequency resources to be used for frequency hopping within the initial access BWP. Specifically, the user terminal may determine the use of a certain number of PRBs (for example, one PRB)

at both the edges of the initial access BWP for frequency resources of each of the first hop and the second hop.

Figure 4B:
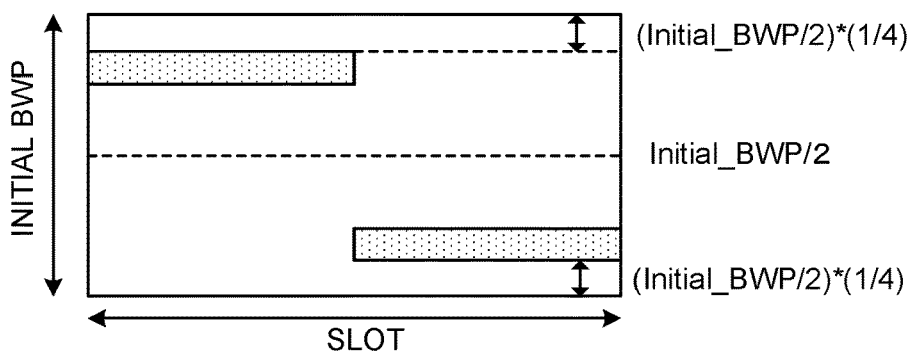

As shown in FIG. 4B, when the cell-specific PRB offset indicated by the RMSI index value is "floor((Initial_BWP/2)*(1/4))", the user terminal may determine the use of a certain number of PRBs away from both the edges of the initial access BWP by floor((Initial_BWP/2)*(1/4)) for PUCCH frequency resources to be used for frequency hopping within the initial access BWP. Specifically, the user terminal may determine the use of a certain number of PRBs (for example, one PRB) away from both the edges of the initial access BWP by floor((Initial_BWP/2)*(1/4)) for frequency resources of the first hop and the second hop respectively.

Figure 4C:
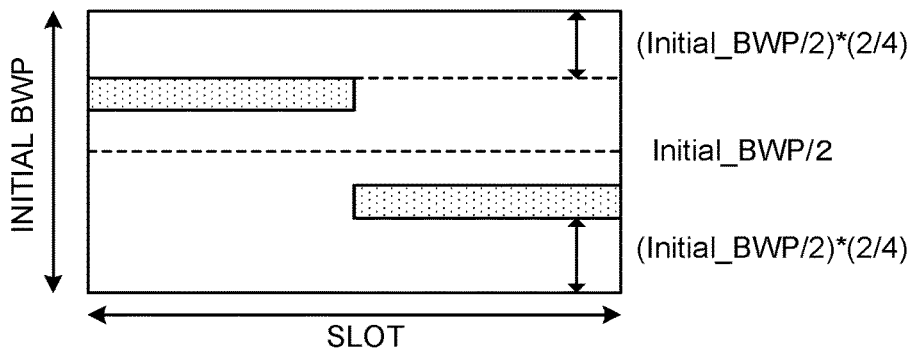
Figure 4D:
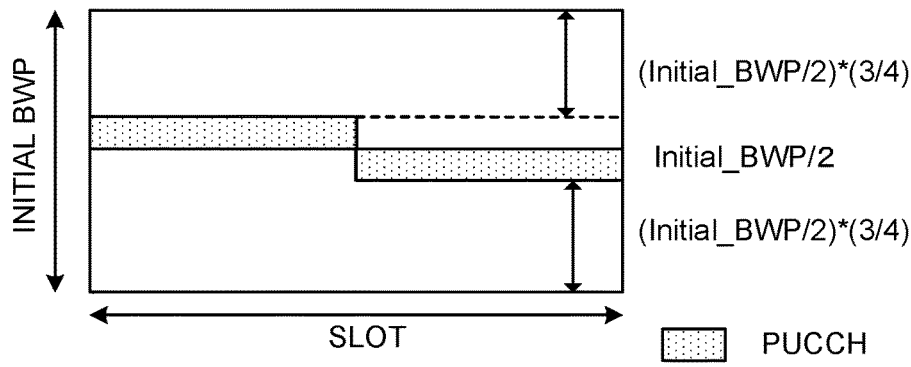
Figure 5A:
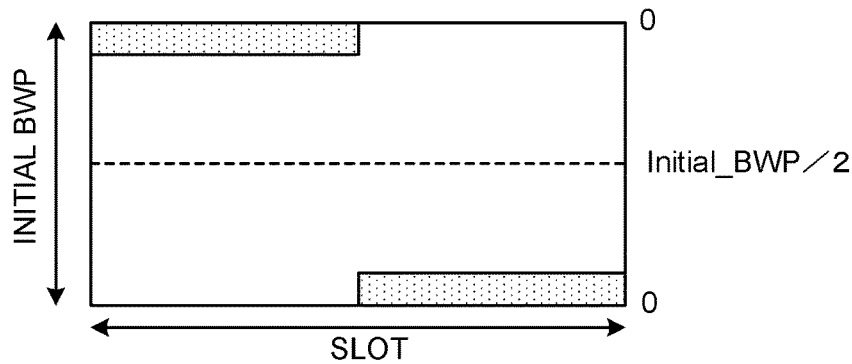
FIGS. 5A to 5D are each a diagram to show an example of frequency hopping using the cell-specific PRB offset of four values according to the first aspect.
Figure 5B:
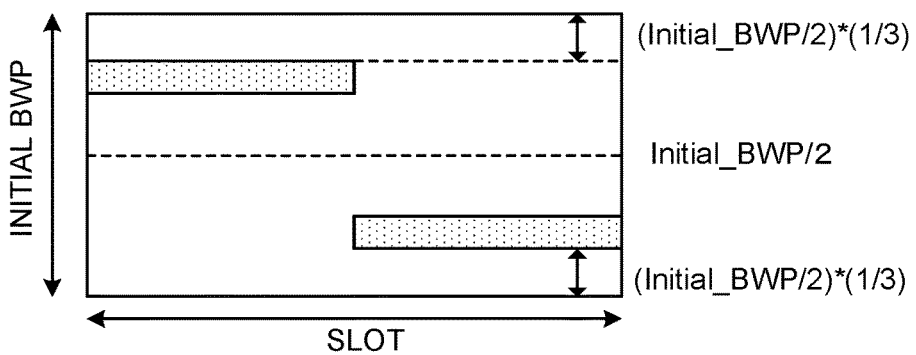
Figure 5C:
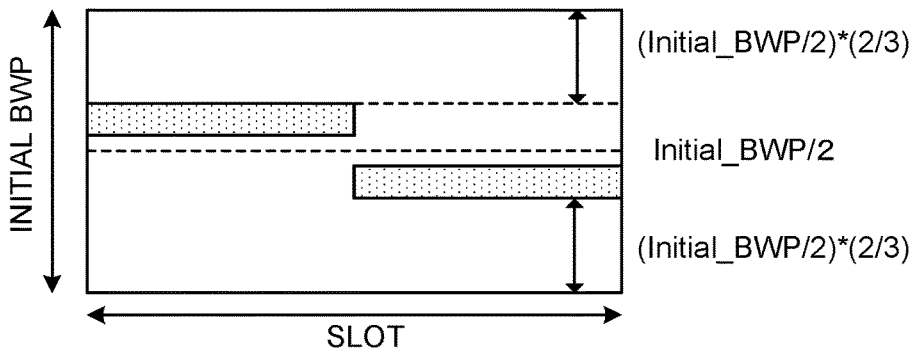
Figure 5D:
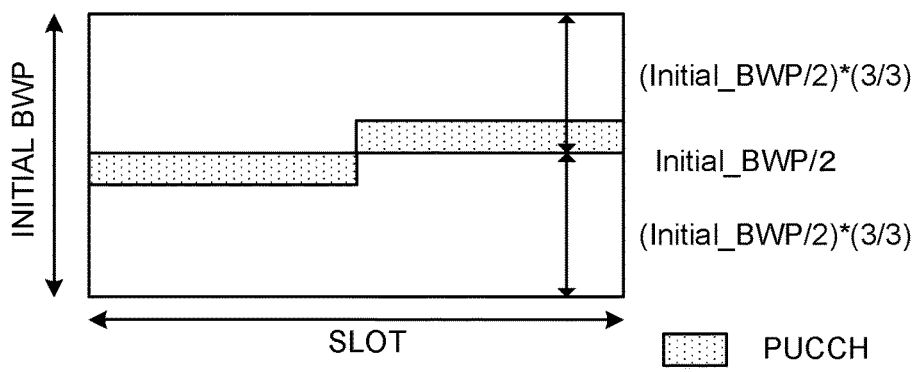

In a similar manner, in FIGS. 4C and 4D, the user terminal may determine the use of a certain number of PRBs away from both the edges of the initial access BWP by the cell-specific PRB offsets "floor((Initial_BWP/2)*(2/4))" and "floor((Initial_BWP/2)*(3/4))" indicated by respective RMSI index values for PUCCH frequency resources to be used for frequency hopping within the initial access BWP.

In this manner, for each value of the cell-specific PRB offset, a ratio with respect to the entire bandwidth obtained by equally dividing the bandwidth from each edge to the center (or to the PRB at the center) of the initial access BWP may be used. Specifically, the value may be a value obtained by multiplying the bandwidth by a certain coefficient α (α≤0). For example, in FIGS. 4A to 4D, the bandwidth from each edge to the center of the initial access BWP is equally divided into four, but this is not restrictive. For example, the bandwidth may be equally divided into three as shown in FIGS. 5A to 5D.

FIGS. 5A to 5D are each a diagram to show another example of frequency hopping using the cell-specific PRB offset of four values according to the first aspect. FIGS. 5A to 5D are different from FIGS. 4A to 4D in that the bandwidth from each edge to the center of the initial access BWP in FIGS. 5A to 5D is equally divided into three. In the description of FIGS. 5A to 5D, the difference from FIGS. 4A to 4D will be mainly described.

In the case shown in FIGS. 5A to 5D, as the cell-specific PRB offset, four values {0, floor((Initial_BWP/2)*(1/3)), floor((Initial_BWP/2)*(2/3)), floor((Initial_BWP/2)*(3/3))} may be used. In this case, the four values indicated by the RMSI index values shown in FIG. 3 are also substituted by {0, floor((Initial_BWP/2)*(1/3)), floor((Initial_BWP/2)*(2/3)), floor((Initial_BWP/2)*(3/3))}.

As shown in FIGS. 4A to 4D and 5A to 5D, by using a ratio with respect to the entire bandwidth obtained by equally dividing the bandwidth from each edge to the center (or to the PRB at the center) of the initial access BWP for each value of the cell-specific PRB offset, PUCCH resources to be used for frequency hopping can be distributed in the entire initial access BWP.

<Cell-Specific PRB Offset of Two Values>

Figure 6A:
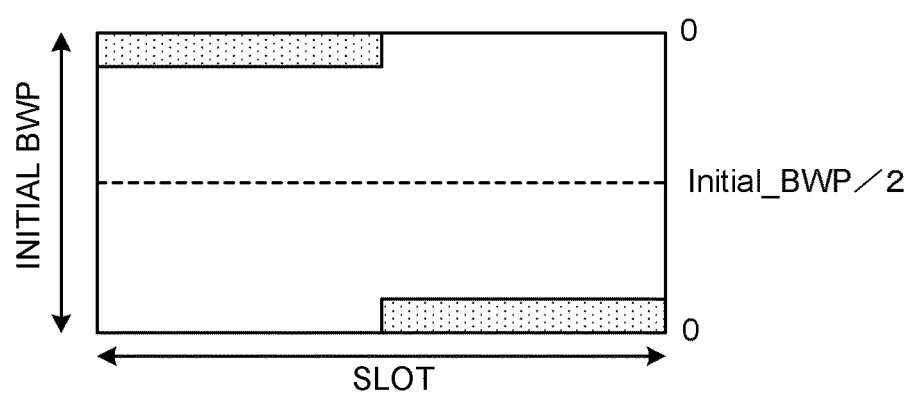
FIGS. 6A and 6B are each a diagram to show an example of frequency hopping using a cell-specific PRB offset of two values according to the first aspect.
Figure 6B:
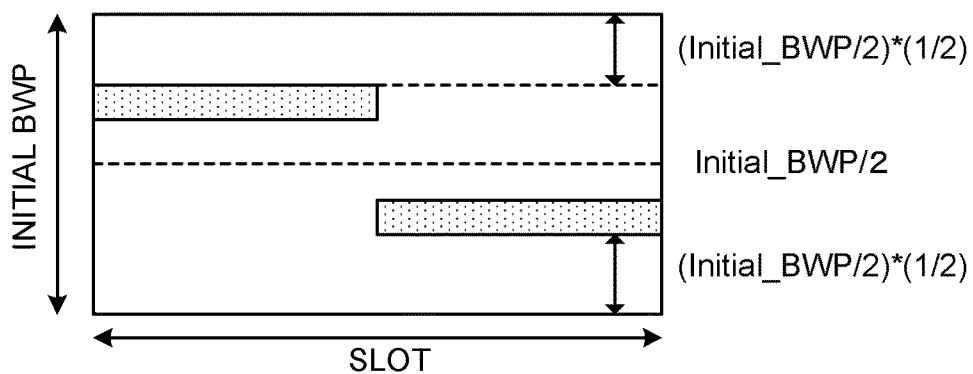

FIGS. 6A and 6B are each a diagram to show an example of frequency hopping using a cell-specific PRB offset of two values according to the first aspect. As shown in FIGS. 6A and 6B, when the cell-specific PRB offset of two values is used, the bandwidth from each edge to the center of the initial access BWP may be equally divided into two.

In the case shown in FIGS. 6A and 6B, as the cell-specific PRB offset, two values {0, floor((Initial_BWP/2)*(1/2))} may be used.

Figure 7A:
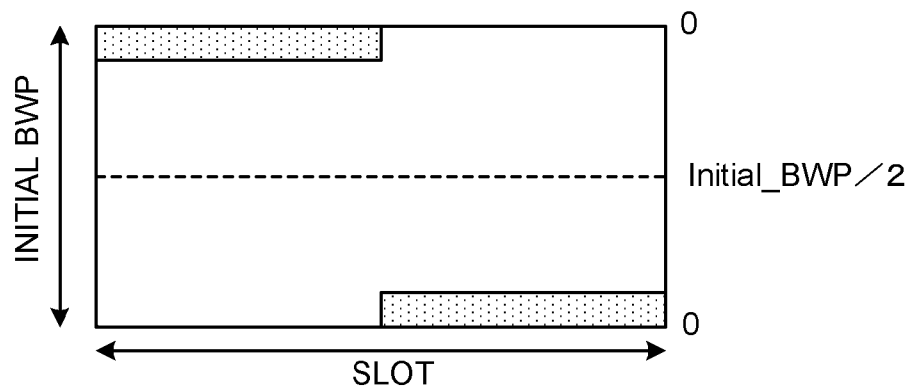
FIGS. 7A and 7B are each a diagram to show another example of frequency hopping using the cell-specific PRB offset of two values according to the first aspect.
Figure 7B:
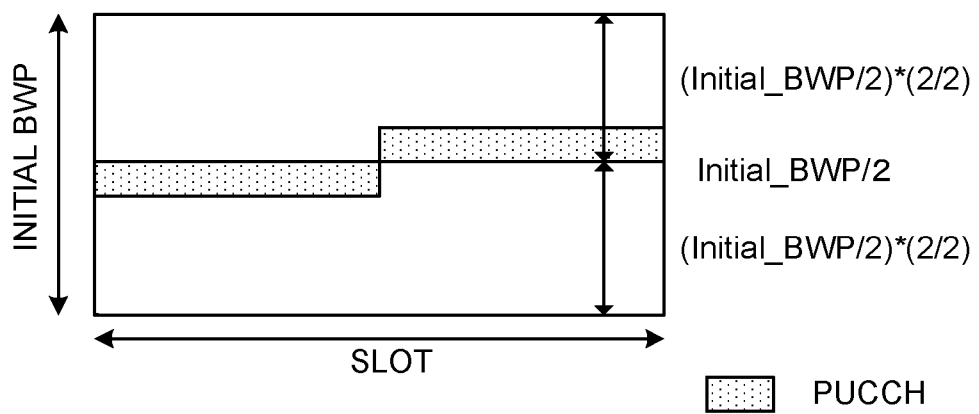

FIGS. 7A and 7B are each a diagram to show another example of frequency hopping using the cell-specific PRB offset of two values according to the first aspect. FIGS. 7A and 7B are different from FIGS. 6A and 6B in that two values {0, floor((Initial_BWP/2)*(2/2))} are used as the cell-specific PRB offset.

FIG. 8 is a diagram to show an example of the RMSI index values indicating the cell-specific PRB offset of two values according to the first aspect. As shown in FIG. 8, each PUCCH period may be associated with a cell-specific PRB offset of two values, and the cell-specific PRB offset of two values may be indicated by respective two different RMSI indexes. For example, in FIG. 8, each of four PUCCH periods of 2, 4, 10, and 14 symbols is associated with a cell-specific PRB offset of two values.

<Selection of Four Values or Two Values>

Whether the cell-specific PRB offset has the above two values or the above four values may be (1) defined in a specification, (2) determined based on a PUCCH period, or (3) determined based on an initial access BWP.

For example, when the above selection is "(1) defined in a specification", as shown in FIG. 3, a table defining the RMSI index indicating the cell-specific PRB offset of four values for each PUCCH period may be provided. Alternatively, as shown in FIG. 8, a table defining the RMSI index indicating the cell-specific PRB offset of two values for each PUCCH period may be provided. Alternatively, as shown in FIG. 9, a table defining the RMSI index indicating the cell-specific PRB offset of four values and two values depending on a PUCCH period may be provided.

Alternatively, (2) the user terminal may determine which cell-specific PRB offset of four values or two values is to be used, based on a PUCCH period used for transmission of UCI. For example, the user terminal may determine which table of FIG. 3 or FIG. 8 is to be used, based on a PUCCH period.

Alternatively, (3) the user terminal may determine which cell-specific PRB offset of four values or two values is to be used, based on the number of PRBs constituting the initial access BWP used for transmission of UCI. For example, the user terminal may determine which table of FIG. 3 or FIG. 8 is to be used, based on the number of PRBs constituting the initial PRB.

According to the first aspect, PUCCH frequency resources to be used for frequency hopping within the initial access BWP are determined by using the cell-specific PRB offset based on the initial access BWP. Therefore, in comparison with a case where a fixed value is used as the cell-specific PRB offset, the PUCCH frequency resources can be flexibly allocated.

(Second Aspect)

In the second aspect, the initial CS index in UE-specific PUCCH resources will be described.

The tables of FIG. 2A and FIG. 2B described above show an initial CS index of a case of r=0 and an initial CS index of a case of r=1 for each ARI. As described above, r may be a value based on the CCE index. For example, r may be a value obtained by normalizing the CCE index using an aggregation level, i.e., (CCE index/Aggregation level) mod 2.

A base sequence to which a CS is applied may be a CAZAC (Constant Amplitude Zero Auto-Correlation) sequence such as a Zadoff-Chu sequence (for example, a sequence with a low PAPR (peak-to-average power ratio)), may be a sequence defined in a specification (for example, a sequence with a low PAPR, or a sequence given in a table), or may be a sequence in conformity to a CAZAC sequence (a CG-CAZAC (computer generated CAZAC) sequence). CS hopping based on the initial CS index may be performed.

A signal using the base sequence and the CS may be a DMRS (Demodulation Reference Signal) of PF 0 (each value of UCI) and PF 1.

In FIG. 2A, for example, when the ARI is "000", the UE with r=0 has the initial CS index of "0", and thus uses a CS index {0, 6} according to a value of UCI, whereas the UE with r=1 has the initial CS index of "3", and thus uses a CS index {3, 9} according to a value of UCI. Therefore, for PF 0, an interval between the CS indexes corresponding to two values of UCI is 6, and an interval between the CS indexes corresponding to r=0 and 1 is 3, irrespective of a value of the ARI.

Therefore, when 12 CS indexes are available for one PRB, the interval between the CS indexes corresponding to two values of UCI is a maximum value, and the interval between the CS indexes corresponding to r=0 and 1 is a maximum value.

In FIG. 2B, for example, when the ARI is "000", the UE with r=0 has the initial CS index of "0", and thus uses a CS index {0}, whereas the UE with r=1 has the initial CS index of "3", and thus uses a CS index {3}. Therefore, for PF 1 as well, an interval between the CS indexes corresponding to r=0 and 1 is 3, irrespective of a value of the ARI.

The interval between the CS indexes corresponding to r=0 and 1 may be increased. The interval between the CS indexes corresponding to r=0 and 1 may be a maximum value (corresponding to phase rotation r). When 12 CS indexes are available for one PRB, the interval between the CS indexes corresponding to r=0 and 1 may be a maximum value of 6. For example, the initial CS index corresponding to r=0 may be "0", and the initial CS index corresponding to r=0 may be "6".

To use such initial CS indexes, either an independent table or a common table as described below may be used.

<Independent Table>

PUCCH resources indicated by the ARI may be specified by using individual tables for a plurality of PUCCH formats.

FIG. 10A is a diagram to show an example of a table for PF 0. FIG. 10A is similar to FIG. 2A.

FIG. 10B is a diagram to show an example of a table for PF 1. When comparing the table for PF 1 and the table for PF 0, the table for PF 1 is different from the table for PF 0 in that the initial CS index corresponding to r=1 of the table for PF 1 is "6".

For example, two CSs (CS amounts) are used in PF 0, and one CS (CS amount) is used in PF 1.

Therefore, when the initial CS index "0" is specified in the table for PF 0 shown in FIG. 10A, UCI is transmitted by using a CS of the CS index {0, 6} according to a UCI value. When the initial CS index "3" is specified, UCI is transmitted by using a CS of the CS index {3, 9} according to a UCI value.

In contrast, when the initial CS index "0" is specified in the table for PF 1 shown in FIG. 10B, UCI is transmitted by using the initial CS index {0}. In a similar manner, when the initial CS index "6" is specified, UCI is transmitted by using the initial CS index {6}.

<Common Table>

PUCCH resources indicated by the ARI may be specified by using a common table for a plurality of PUCCH formats.

FIG. 11 is a diagram to show an example of a common table for PF 0 and PF 1. In FIG. 11, PUCCH resources indicated by the ARI are specified in the common table for PFs 0 and 1.

When comparing FIG. 11 to FIG. 10A and FIG. 10B, FIG. 11 is different from FIG. 10A and FIG. 10B in that the initial CS index corresponding to r=1 of FIG. 11 is $\alpha_1$. For example, $\alpha_1=3$ may be specified for PF 0, and $\alpha_1=6$ may be specified for PF 1.

In a case of PF 0, when the initial CS index "0" is specified in the table shown in FIG. 11, UCI is transmitted by using a CS of the CS index {0, 6} according to a UCI value. When the initial CS index "3" is specified, UCI is transmitted by using a CS of the CS index {3, 9} according to a UCI value.

In contrast, in a case of PF 1, when the initial CS index "0" is specified in the table shown in FIG. 11, UCI is transmitted by using the CS index {0}. When the initial CS index "6" is specified, UCI is transmitted by using the initial CS index {6}.

When the common table shown in FIG. 11 is used, tables for PFs 0 and 1 can be communalized.

Note that, in FIG. 10A, FIG. 10B, and FIG. 11, for PF 0, an interval between the initial CS indexes corresponding to r=0 and 1 may be 3. Thus, the initial CS indexes corresponding to r=0 and 1 may be any one of {3, 6}, {6, 9}, and {9, 0}. For PF 1, an interval between the initial CS indexes corresponding to r=0 and 1 may be 6. Thus, the initial CS indexes corresponding to r=0 and 1 may be any one of {3, 9}, {6, 0}, and {9, 3}.

In this manner, a difference between different initial CS shift indexes (initial CS indexes corresponding to r=0 and 1) based on different PDCCHs (for example, CCE indexes) may be different depending on PF 0 and PF 1.

When the table of FIG. 10B or FIG. 11 is used for PF 1, the CS indexes {3} and {9} are not used, unlike the table for PF 1 shown in FIG. 2B. Note that CS indexes (for example, {3} and {9}) not specified in the table of FIG. 10B or FIG. 11 may be available as PUCCH resources after RRC connection setup.

<Orthogonal Sequence of PF 1>

In PF 1, it may be assumed that an orthogonal sequence (time domain OCC (orthogonal cover code), OCC) is fixed. For example, in PF 1, it may be assumed that information (orthogonal sequence index, SF (Spread Factor) index) i specifying an orthogonal sequence is 0.

In PF 1, it may be assumed that an orthogonal sequence is not used.

Therefore, when a plurality of UEs transmit PUCCHs of PF 1 including different CSs, a plurality of PUCCHs may be multiplexed in CDM.

According to the second aspect, for PF 1, in comparison with a case of using the table of FIG. 2B, the interval between the CS indexes corresponding to r=0 and 1 is increased. As a result, tolerance to frequency selectivity can be enhanced, and communication quality can be improved.

In the table shown in FIG. 2B, only the UE-specific PRB offset of two values can be applied to PF 1. In the tables shown in FIG. 10B and FIG. 11, however, the UE-specific PRB offset of four values can also be applied to PF 1, in a similar manner to PF 0. In this manner, the UE-specific PRB offset that can be applied to PF 1 can be increased. Therefore, PUCCH frequency resources to be used for frequency hopping within a certain bandwidth can be more flexibly determined than the table shown in FIG. 2B.

(Third Aspect)

In the third aspect, whether frequency hopping is enabled or disabled (enable/disable) in cell-specific PUCCH resources will be described.

Information indicating whether frequency hopping is enabled or disabled may be added to the information of PUCCH resources based on the RMSI index value as in FIG. 3 described above.

<Case where Only "Frequency Hopping Enabled" is Supported>

The PUCCH may support only "frequency hopping enabled". As shown in FIG. 12, the frequency hopping may be enabled in all of the PUCCH resources. Common PUCCH resources for FR (Frequency Range) 1 and FR 2 may be specified as one table.

FR 1 may be a frequency range lower than a certain frequency. FR 2 may be a frequency range lower than the certain frequency. The certain frequency may be 6 GHz. FR 1 may be 450 to 6000 MHz, and FR 2 may be 24250 to 52600 MHz.

<Case where Enable/Disable of Frequency Hopping is Different Depending on Frequency Range>

Whether frequency hopping is enabled or disabled in the PUCCH may be different depending on a frequency range. PUCCH resources for FR 1 and PUCCH resources for FR 2 may be specified as independent tables.

For FR 1, as shown in FIG. 12 described above, frequency hopping may be enabled in all of the PUCCH resources. For FR 2, as shown in FIG. 13, frequency hopping may be disabled in all of the PUCCH resources.

When a subcarrier spacing of FR 2 is higher than a subcarrier spacing of FR 1, symbol time of FR 2 is shorter than symbol time of FR 1. When PUCCH time is short with respect to time (transient time) taken before a waveform is stabilized at the time of frequency hopping, communication quality may be deteriorated. Such deterioration of communication quality can be avoided by disabling frequency hopping in FR 2.

<Case where Enable/Disable of Frequency Hopping is Different Depending on Frequency Range and PUCCH Period>

Whether frequency hopping is enabled or disabled in the PUCCH may be different depending on a frequency range and a PUCCH period. PUCCH resources for FR 1 and PUCCH resources for FR 2 may be specified as independent tables.

For FR 1, as shown in FIG. 12 described above, it may be indicated that frequency hopping is enabled in all of the PUCCH resources. For FR 2, as shown in FIG. 14, frequency hopping may be disabled in PUCCH resources having a PUCCH period of a certain period or less, and frequency hopping may be enabled in PUCCH resources having a PUCCH period longer than the certain period. The certain period may be 2 symbols, for example.

When a subcarrier spacing of FR 2 is higher than a subcarrier spacing of FR 1, symbol time of FR 2 is shorter than symbol time of FR 1. When PUCCH time is short with respect to time (transient time) taken before a waveform is stabilized at the time of frequency hopping, communication quality may be deteriorated. When the PUCCH period is 2 symbols in FR 2, the PUCCH time is particularly shortened, and thus communication quality may be deteriorated. Such deterioration of communication quality can be avoided by disabling frequency hopping when the PUCCH period of FR 2 is 2 symbols.

Note that FIG. 8 or FIG. 9 may indicate whether frequency hopping is enabled or disabled, in accordance with the rules of FIG. 12, FIG. 13, or FIG. 14.

According to the third aspect, whether frequency hopping is enabled or disabled can be configured as cell-specific PUCCH resources. Deterioration of communication quality can be avoided if determination as to whether frequency hopping is enabled or disabled is made based on at least one of a frequency range and a PUCCH period (number of symbols).

(Fourth Aspect)

In the fourth aspect, the orthogonal sequence in the UE-specific PUCCH resources will be described.

The UE-specific PUCCH resources may include information related to an orthogonal sequence.

When at least one of a CS and an orthogonal sequence of the PUCCH of PF 1 transmitted to a plurality of UEs is different, a plurality of PUCCHs may be multiplexed in CDM.

In PF 1, a signal z obtained by subjecting a block $y(0), \ldots, y(N_{sc}-1)$ of a complex value symbol to be transmitted to spreading using an orthogonal sequence $w_i(m)$ may be given according to the following formula (1).

[Formula 1]

$$z(m'N_{sc}N_{SF,0} + nN_{sc} + n) = w_i(m) \cdot y(n) \quad (1)$$
$$n = 0, 1, \ldots, N_{sc} - 1$$
$$m = 0, 1, \ldots, N_{SF} - 1$$
$$m' = \begin{cases} 0 & \text{INTRA-SLOT FREQUENCY HOPPING DISABLED} \\ 0, 1 & \text{INTRA-SLOT FREQUENCY HOPPING ENABLED} \end{cases}$$

Here, $N_{sc}$ represents the number (for example, 12) of subcarriers in one PRB, $N_{SF}$ represents an orthogonal sequence capacity (number of orthogonal sequences, orthogonal sequence length), and $N_{SF,0}$ represents an orthogonal sequence capacity corresponding to m'=0.

As shown in FIG. 15, for PF 1, the PUCCH period (PUCCH length, number of PUCCH symbols) and information as to whether intra-slot frequency hopping (intra-slot hopping) is enabled or disabled may be associated with the orthogonal sequence capacity.

In the PUCCH of PF 1, symbols of a DMRS and symbols of UCI may be alternately mapped. Spreading using an orthogonal sequence may be performed for the DMRS, and spreading using an orthogonal sequence may be performed for the UCI.

When intra-slot frequency hopping is enabled, two orthogonal sequence capacities, specifically, an orthogonal sequence capacity in the first hop (before hopping) and an orthogonal sequence capacity in the second hop (after hopping), are determined for each of the DMRS and the UCI. The orthogonal sequence capacity corresponding to m'=0 may be the smaller orthogonal sequence capacity of the two orthogonal sequence capacities, and the orthogonal sequence capacity corresponding to m'=1 may be the larger orthogonal sequence capacity of the two orthogonal sequence capacities.

As shown in FIG. 16, orthogonal sequences for PF 1 may be specified. An orthogonal sequence of an orthogonal sequence capacity $N_{SF}$ is specified for each of the orthogonal sequence capacities. The orthogonal sequence may be given according to the following formula (2), using information (orthogonal sequence index) i specifying an orthogonal sequence and information p related to a phase.

[Formula 2]

$$w_i(m) = e^{j2\pi\varphi(m)/N_{SF}} \quad (2)$$

As shown in FIG. 17, the UE-specific PUCCH resources may include an initial CS index and an orthogonal sequence index i.

When comparing FIG. 17 and FIG. 11, FIG. 17 is different from FIG. 11 in that FIG. 17 includes the orthogonal sequence index i corresponding to each of r=0 and r=1. The initial CS index corresponding to r=1 is $\alpha_1$, in a similar manner to FIG. 11. $\alpha_1=3$ may be specified for PF 0, and $\alpha_1=6$ may be specified for PF 1.

Note that, in FIG. 17, for PF 0, an interval between the initial CS indexes corresponding to r=0 and 1 may be 3. Thus, the initial CS indexes corresponding to r=0 and 1 may be any one of {3, 6}, {6, 9}, and {9, 0}. For PF 1, an interval between the initial CS indexes corresponding to r=0 and 1 may be 6. Thus, the initial CS indexes corresponding to r=0 and 1 may be any one of {3, 9}, {6, 0}, and {9, 3}.

The orthogonal sequence index i corresponding to r=0 may be 0. The orthogonal sequence index i corresponding to r=1 may be $S_1$. $S_1$ may be determined based on the orthogonal sequence capacity $N_{SF}$. For example, $S_1$ may be determined by using either of following determination methods 1 and 2.

<Determination Method 1>
$S_1=0$, when $N_{SF}$ is 1
$S_1=1$, when $N_{SF}$ is 2 or greater
<Determination Method 2>
$S_1=0$, when $N_{SF}$ is 1
$S_1=1$, when $N_{SF}$ is 2
$S_1=2$, when $N_{SF}$ is 3
$S_1=3$, when $N_{SF}$ is 4
$S_1=4$, when $N_{SF}$ is 5
$S_1=5$, when $N_{SF}$ is 6
$S_1=6$, when $N_{SF}$ is 7

To obtain $S_1$ as above, $S_1$ may be calculated according to $N_{SF}-1$. These two orthogonal sequence indexes may be determined so that a difference between the orthogonal sequence index corresponding to r=0 and the orthogonal sequence index corresponding to r=1 has a maximum value.

In PF 1, multiplexing using a CS may have lower tolerance to frequency selectivity in comparison with multiplexing using an orthogonal sequence. In contrast, multiplexing using an orthogonal sequence may have lower tolerance to UE movement speed in comparison with multiplexing using a CS.

According to the fourth aspect, for PF 1, by multiplexing PUCCHs of a plurality of UEs by using a CS and an orthogonal sequence, tolerance to frequency selectivity can be enhanced in comparison with a case where PUCCHs of a plurality of UEs are multiplexed using only a CS. By multiplexing PUCCHs of a plurality of UEs by using a CS and an orthogonal sequence, tolerance to frequency selectivity and tolerance to UE movement speed can be achieved.

(Fifth Aspect)

In the fifth aspect, PUCCH resources before RRC connection may be allocated avoiding the last period of a slot.

In the PUCCH resources before RRC connection, a cell-specific frequency offset and a cell-specific time offset may be associated with each other.

For example, for the PUCCH, the UE before RRC connection determines a starting symbol index or a cell-specific symbol index offset, according to a value of the cell-specific PRB offset. The UE may use one of following determination methods 1 and 2.

<Determination Method 1>

The four values {0, floor((Initial_BWP/2)*(1/4)), floor((Initial_BWP/2)*(2/4)), floor((Initial_BWP/2)*(3/4))} of the cell-specific PRB offset as shown in FIG. 3 may be associated with the symbol index offset of {0, 1, 2, 3} symbols.

The UE determines a symbol index offset corresponding to the cell-specific PRB offset, according to determination of the cell-specific PRB offset. The UE allocates the PUCCH, avoiding a period of the symbol index offset from the end of a slot. For example, when the symbol index offset is 0, the PUCCH is allocated up to the last symbol of a slot. When the symbol index offset is 1, the PUCCH is allocated avoiding the last one symbol of a slot.

According to determination method 1, when the PUCCH resources are changed to the frequency direction due to a change of the RMSI index value caused by the association between the cell-specific PRB offset and the symbol index offset, the PUCCH resources are changed to the time direction as well. The UE can allocate the PUCCH, avoiding the last zero to three symbols of a slot.

<Determination Method 2>

The four values {0, floor((Initial_BWP/2)*(1/4)), floor((Initial_BWP/2)*(2/4)), floor((Initial_BWP/2)*(3/4))} of the cell-specific PRB offset as shown in FIG. 3 may be associated with the symbol index offset of {0, 0, 1, 2} symbols.

The UE determines a symbol index offset corresponding to the cell-specific PRB offset, according to determination of the cell-specific PRB offset. The UE allocates the PUCCH, avoiding a period of the symbol index offset from the end of a slot. For example, when the symbol index offset is 0, the PUCCH is allocated up to the last symbol of a slot. When the symbol index offset is 1 or 2, the PUCCH is allocated avoiding the last one or two symbols of a slot.

According to determination method 2, when the PUCCH resources are changed to the frequency direction due to a change of the RMSI index value in the last two values of the four values of the cell-specific PRB offset, the PUCCH resources are changed to the time direction as well. The UE can allocate the PUCCH, avoiding the last zero to two symbols of a slot. It is assumed that an SRS and a short PUCCH are transmitted using 1 or 2 symbols. Therefore, if the symbol index offset is 2 symbols at the maximum, the PUCCH can be mapped avoiding the SRS and the short PUCCH.

The PUCCH period may be fixed irrespective of the symbol index offset. In this case, the PUCCH shifts to the start of a slot due to increase of the symbol index offset.

The PUCCH period may be changed due to the symbol index offset. For example, the PUCCH period may be shortened due to increase of the symbol index offset.

Association between the cell-specific PRB offset and the symbol index offset may be defined in a specification. The symbol index offset may be added to the tables as in FIG. 3, FIG. 8, FIG. 9, and FIG. 12 to FIG. 14.

According to the fifth aspect, in a cell in which an SRS (Sounding Reference Signal) or a short PUCCH (PF 0, PF 2) after RRC connection is transmitted using the last symbol of a slot, PUCCH resources before RRC connection can be configured so as to avoid the SRS or the short PUCCH. By associating a time direction offset and a frequency direction offset of PUCCH resources with each other, overhead for notification can be reduced in comparison with a case where the time direction offset and the frequency direction offset are independently configured.

(Radio Communication System)

Hereinafter, a structure of a radio communication system according to the present embodiment will be described. In the radio communication system, the radio communication method according to each aspect described above is applied. Note that the radio communication method according to each aspect described above may be employed independently, or at least two of the radio communication methods may be employed in combination.

Figure 18:
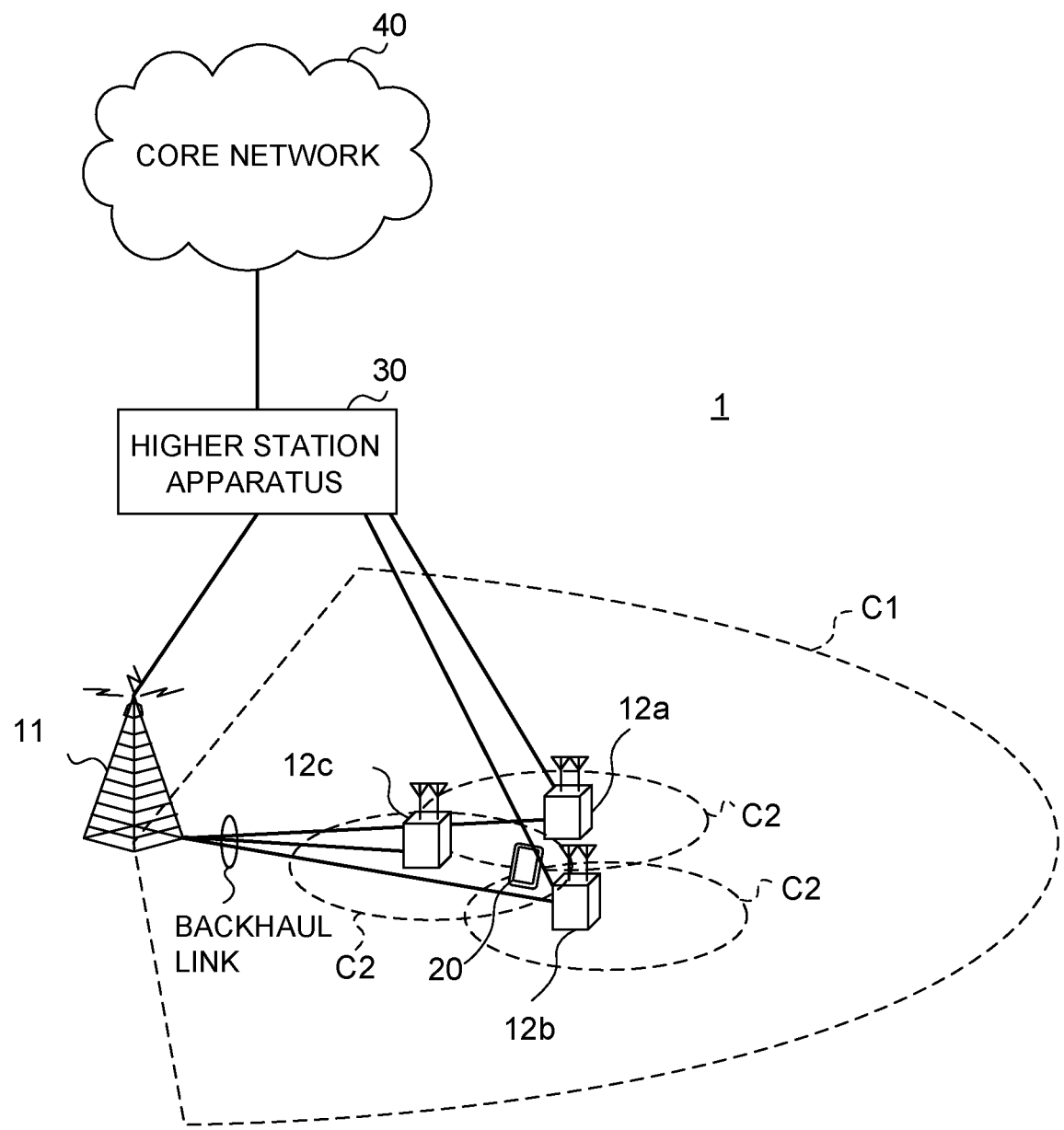
FIG. 18 is a diagram to show an example of a schematic structure of a radio communication system according to the present embodiment.

FIG. 18 is a diagram to show an example of a schematic structure of the radio communication system according to the present embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit. Note that the radio communication system 1 may be referred to as SUPER 3G, LTE-A (LTE-Advanced), IMT-Advanced, 4G, 5G, FRA (Future Radio Access), NR (New RAT (New Radio Access Technology)), or the like.

The radio communication system 1 shown in FIG. 18 includes a radio base station 11 that forms a macro cell C1, and radio base stations 12*a* to 12*c* that form small cells C2, which are placed within the macro cell C1 and which are narrower than the macro cell C1. Also, user terminals 20 are placed in the macro cell C1 and in each small cell C2. Different numerologies may be applied among cells and/or within a cell.

Here, the numerology refers to communication parameters in the frequency direction and/or the time direction (for example, at least one of a spacing between subcarriers (subcarrier spacing), a bandwidth, a symbol length, a CP time length (CP length), a subframe length, a TTI time length (TTI length), the number of symbols in each TTI, a radio frame configuration, a filtering process, a windowing process, and so on). In the radio communication system 1, for example, a subcarrier spacing such as 15 kHz, 30 kHz, 60 kHz, 120 kHz, and 240 kHz may be supported.

The user terminals 20 can connect with both the radio base station 11 and the radio base stations 12. It is assumed that the user terminals 20 use the macro cell C1 and the small cells C2, which use different frequencies, at the same time by means of CA or DC. The user terminals 20 can adopt CA or DC by using a plurality of cells (CCs) (for example, two or more CCs). As the plurality of cells, the user terminals can use a licensed band CC and an unlicensed band CC.

The user terminals 20 can perform communication by using time division duplex (TDD) or frequency division duplex (FDD) in each cell. The TDD cell and the FDD cell may be respectively referred to as a TDD carrier (frame configuration type 2), and an FDD carrier (frame configuration type 1), for example.

Furthermore, in each cell (carrier), a single numerology may be employed, or a plurality of different numerologies may be employed.

Between the user terminals 20 and the radio base station 11, communication can be carried out by using a carrier of a relatively low frequency band (for example, 2 GHz) and a narrow bandwidth (referred to as, for example, an "existing carrier," a "Legacy carrier" and so on). Meanwhile, between the user terminals 20 and the radio base stations 12, a carrier of a relatively high frequency band (for example, 3.5 GHz, 5 GHz, 30 to 70 GHz, and so on) and a wide bandwidth may be used, or the same carrier as that used between the user terminals 20 and the radio base station 11 may be used. Note that the structure of the frequency band for use in each radio base station is by no means limited to these.

Connection between the radio base station 11 and each radio base station 12 (or between two radio base stations 12) may be implemented by a configuration enabling wired connection (for example, an optical fiber in compliance with CPRI (Common Public Radio Interface), an X2 interface, and so on), or enabling radio connection.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "gNB (gNodeB)," a "transmission/reception point (TRP)" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "eNBs," "gNBs," "transmission/reception points" and so on. Hereinafter, the radio base stations 11 and 12 will be collectively referred to as "radio base stations 10," unless specified otherwise.

Each of the user terminals 20 is a terminal that supports various communication schemes such as LTE, LTE-A, 5G, and NR, and may include not only mobile communication terminals but stationary communication terminals. The user terminal 20 can perform device-to-device communication (D2D) with another user terminal 20.

In the radio communication system 1, as radio access schemes, OFDMA (orthogonal frequency division multiple access) can be applied to the downlink (DL), and SC-FDMA (single-carrier frequency division multiple access) can be applied to the uplink (UL). OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and OFDMA may be used in the UL.

In the radio communication system 1, multi-carrier waveforms (for example, OFDM waveforms) may be used, or single carrier waveforms (for example, DFT-s-OFDM waveforms) may be used.

In the radio communication system 1, a DL shared channel (also referred to as a PDSCH (Physical Downlink Shared Channel), a DL data channel, and so on), which is shared by the user terminals 20, a broadcast channel (PBCH (Physical Broadcast Channel)), L1/L2 control channels and so on, are used as DL channels. User data, higher layer control information, SIBs (System Information Blocks) and so on are communicated on the PDSCH. The MIBs (Master Information Blocks) are communicated on the PBCH.

The L1/L2 control channels include a DL control channel (a PDCCH (Physical Downlink Control Channel) and an EPDCCH (Enhanced Physical Downlink Control Channel)), a PCFICH (Physical Control Format Indicator Channel), a PHICH (Physical Hybrid-ARQ Indicator Channel) and so on. Downlink control information (DCI), including PDSCH and PUSCH scheduling information, and so on are communicated on the PDCCH. The number of OFDM symbols to use for the PDCCH is communicated on the PCFICH. The EPDCCH is frequency-division multiplexed with the PDSCH and used to communicate DCI and so on, like the PDCCH. Retransmission control information (ACK/NACK) of a HARQ for the PUSCH can be communicated on at least one of the PHICH, the PDCCH, and the EPDCCH.

In the radio communication system 1, a UL shared channel (also referred to as a PUSCH (Physical Uplink Shared Channel), an uplink shared channel, and so on), which is shared by the user terminals 20, an uplink control channel (PUCCH (Physical Uplink Control Channel)), a random access channel (PRACH (Physical Random Access Channel)) and so on are used as UL channels. User data and higher layer control information are communicated on the PUSCH. Uplink control information (UCI) including at least one of retransmission control information (A/N) and channel state information (CSI) of DL signals and so on is communicated on the PUSCH or the PUCCH. By means of the PRACH, random access preambles for establishing connections with cells can be communicated.

<Radio Base Station>

Figure 19:
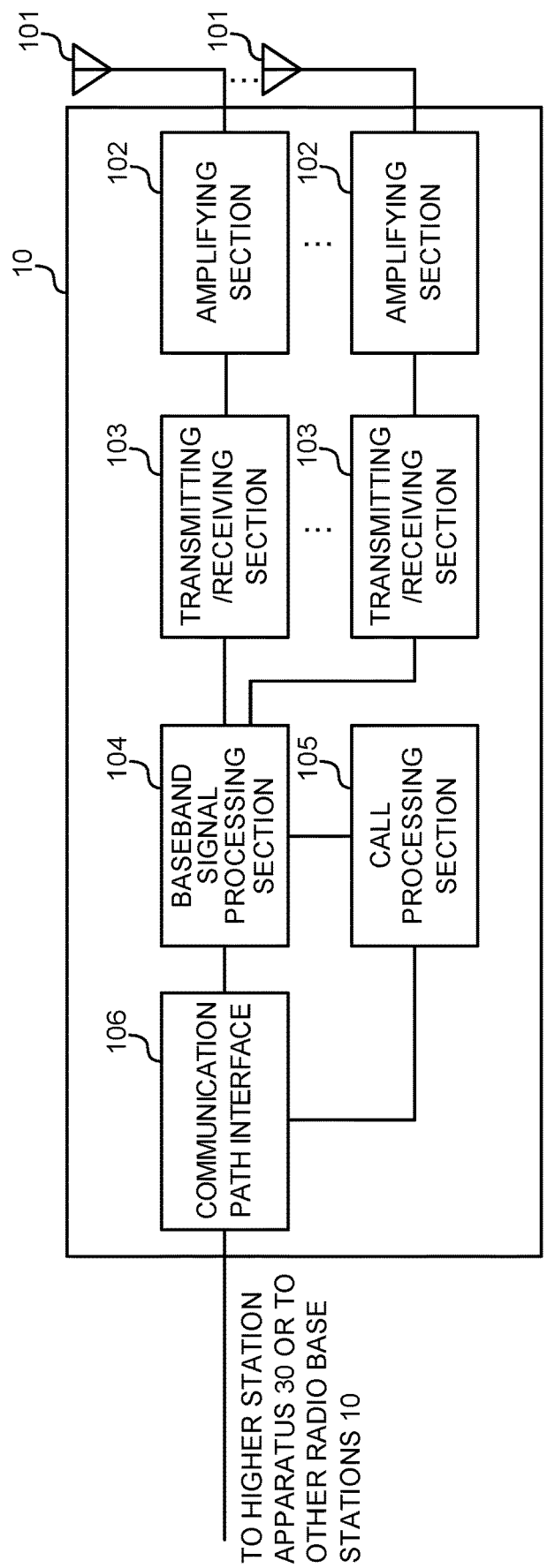
FIG. 19 is a diagram to show an example of an overall structure of a radio base station according to the present embodiment.

FIG. 19 is a diagram to show an example of an overall structure of the radio base station according to the present embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the DL is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101.

It is possible to adopt constitution with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for UL signals, radio frequency signals that are received in the transmitting/receiving antennas 101 are amplified in the amplifying sections 102. The transmitting/receiving sections 103 receive the UL signals amplified in the amplifying sections 102. The transmitting/receiving sections 103 convert the received signals into the baseband signal through frequency conversion and outputs to the baseband signal processing section 104.

In the baseband signal processing section 104, UL data that is included in the UL signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing, such as setting up and releasing for communication channels, manages the state of the radio base station 10, and manages the radio resources.

The transmission line interface 106 transmits and/or receives signals to and/or from the higher station apparatus 30 via a certain interface. The transmission line interface 106 may transmit and/or receive signals (backhaul signaling) with neighboring radio base stations 10 via an inter-base station interface (for example, an optical fiber in compliance with the CPRI (Common Public Radio Interface) and an X2 interface).

The transmitting/receiving sections 103 transmit DL signals (including at least one of a DL data signal, a DL control signal (DCI), a DL reference signal, and system information (for example, RMSI, SIBs, and MIBs)) to the user terminals 20, and receive UL signals (including at least one of a UL data signal, a UL control signal, and a UL reference signal) from the user terminals 20.

The transmitting/receiving sections 103 receive UCI from the user terminals 20 by using an uplink shared channel (for example, a PUSCH) or an uplink control channel (for example, a short PUCCH and/or a long PUCCH). The UCI may include at least one of a HARQ-ACK, CSI, an SR, beam identification information (for example, beam index (BI)), a buffer status report (BSR) of a DL data channel (for example, a PDSCH).

The transmitting/receiving sections 103 may receive uplink control information by using an uplink control channel. The transmitting/receiving sections 103 may transmit system information (for example, RMSI) including index value(s) of one or more resources (PUCCH resources) for the uplink control channel. The transmitting/receiving sections 103 may transmit downlink control information (downlink control channel) including index value(s) (for example, ARI(s)) indicating one or more resources for the uplink control channel.

Figure 20:
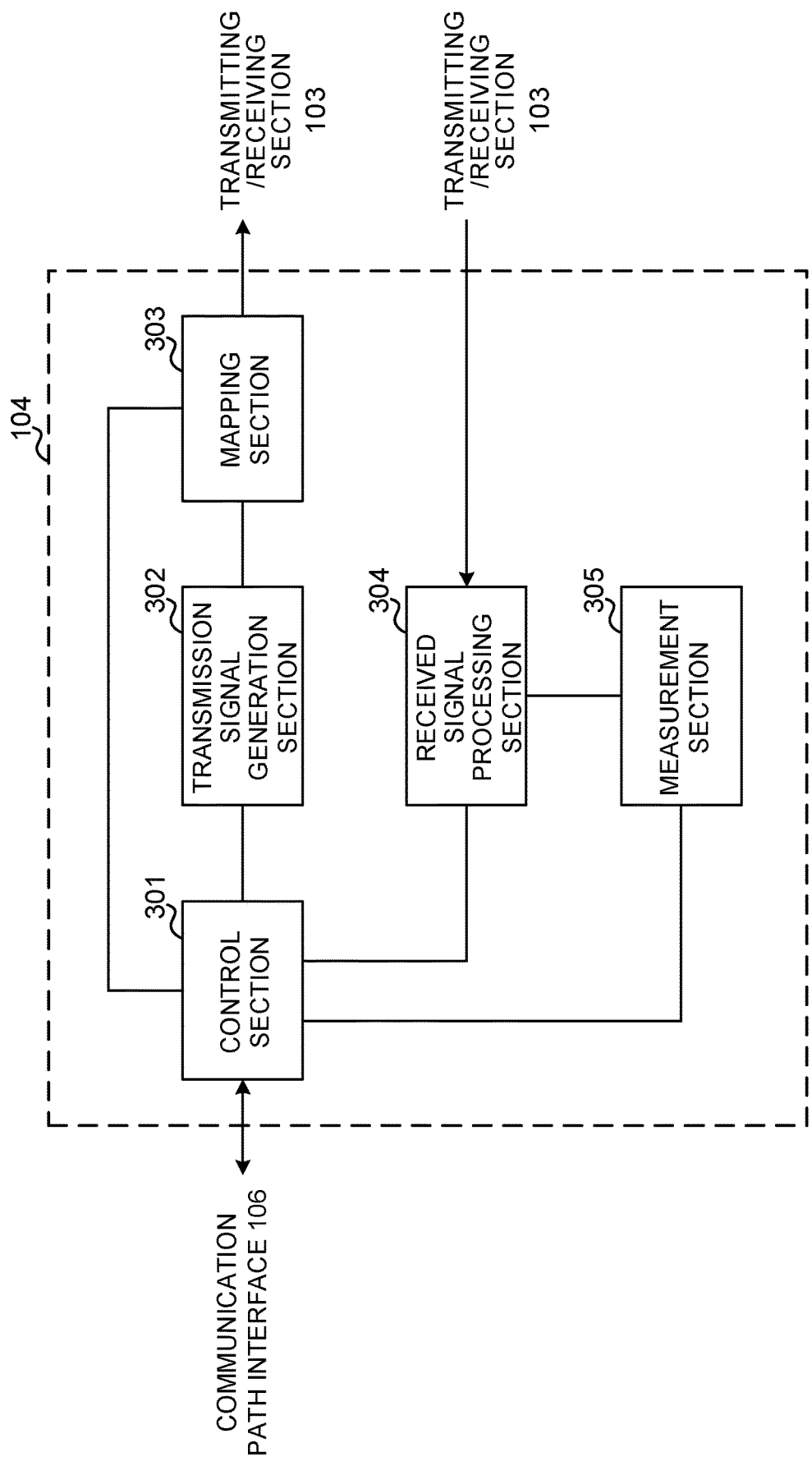
FIG. 20 is a diagram to show an example of a functional structure of the radio base station according to the present embodiment.

FIG. 20 is a diagram to show an example of a functional structure of the radio base station according to the present embodiment. Note that FIG. 20 primarily shows functional blocks that pertain to characteristic parts of the present embodiment, and it is assumed that the radio base station 10 includes other functional blocks that are necessary for radio communication as well. As shown in FIG. 20, the baseband signal processing section 104 includes a control section 301, a transmission signal generation section 302, a mapping section 303, a received signal processing section 304, and a measurement section 305.

The control section 301 controls the whole of the radio base station 10. The control section 301, for example, controls the generation of DL signals in the transmission signal generation section 302, the mapping of DL signals in the mapping section 303, the UL signal receiving processes (for example, demodulation and so on) in the received signal processing section 304, and the measurements in the measurement section 305.

Specifically, the control section 301 performs scheduling of the user terminals 20. Specifically, the control section 301 may perform scheduling and/or retransmission control of the DL data and/or the uplink shared channel, based on UCI (for example, CSI and/or BIs) from the user terminals 20.

The control section 301 may control a configuration (format) of an uplink control channel (for example, a long PUCCH and/or a short PUCCH), and may perform control so as to transmit control information related to the uplink control channel.

The control section 301 may control PUCCH resources. Specifically, the control section 301 may determine one or more PUCCH resources to be notified to the user terminals 20. The control section 301 may control at least one of the generation and the transmission of system information (for example, RMSI) indicating at least one of the determined PUCCH resources.

The control section 301 may determine an index value to be included in the system information from among a plurality of index values indicating at least different numbers of PUCCH resources. For example, the control section 301 may determine the index value, based on the number of user terminals within a cell.

The control section 301 may control the received signal processing section 304 so as to perform receiving processes for UCI from the user terminals 20, based on a format of the uplink control channel.

The control section 301 may control reception of the uplink control channel using an initial cyclic shift index based on the downlink control channel. A difference between a plurality of initial cyclic shift indexes based on a plurality of downlink control channels may be different depending on a format of the uplink control channel.

The control section 301 can be constituted with a controller, a control circuit or control apparatus that can be described based on general understanding of the technical field to which the present invention pertains.

The transmission signal generation section 302 generates DL signals (including a DL data signal, a DL control signal, and a DL reference signal) based on commands from the control section 301 and outputs the DL signals to the mapping section 303.

The transmission signal generation section 302 can be constituted with a signal generator, a signal generation circuit or signal generation apparatus that can be described based on general understanding of the technical field to which the present invention pertains.

The mapping section 303 maps the DL signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of UL signals (for example, including a UL data signal, a UL control signal, and a UL reference signal) that are transmitted from the user terminals 20. Specifically, the received signal processing section 304 may output the received signals and signals after the receiving processes to the measurement section 305. The received signal processing section 304 performs UCI receiving processes, based on an uplink control channel configuration indicated by the control section 301.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305, for example, may measure UL channel quality, based on UL reference signal received power (for example, RSRP (Reference Signal Received Power)) and/or received quality (for example, RSRQ (Reference Signal Received Quality)). The measurement results may be output to the control section 301.

<User Terminal>

Figure 21:
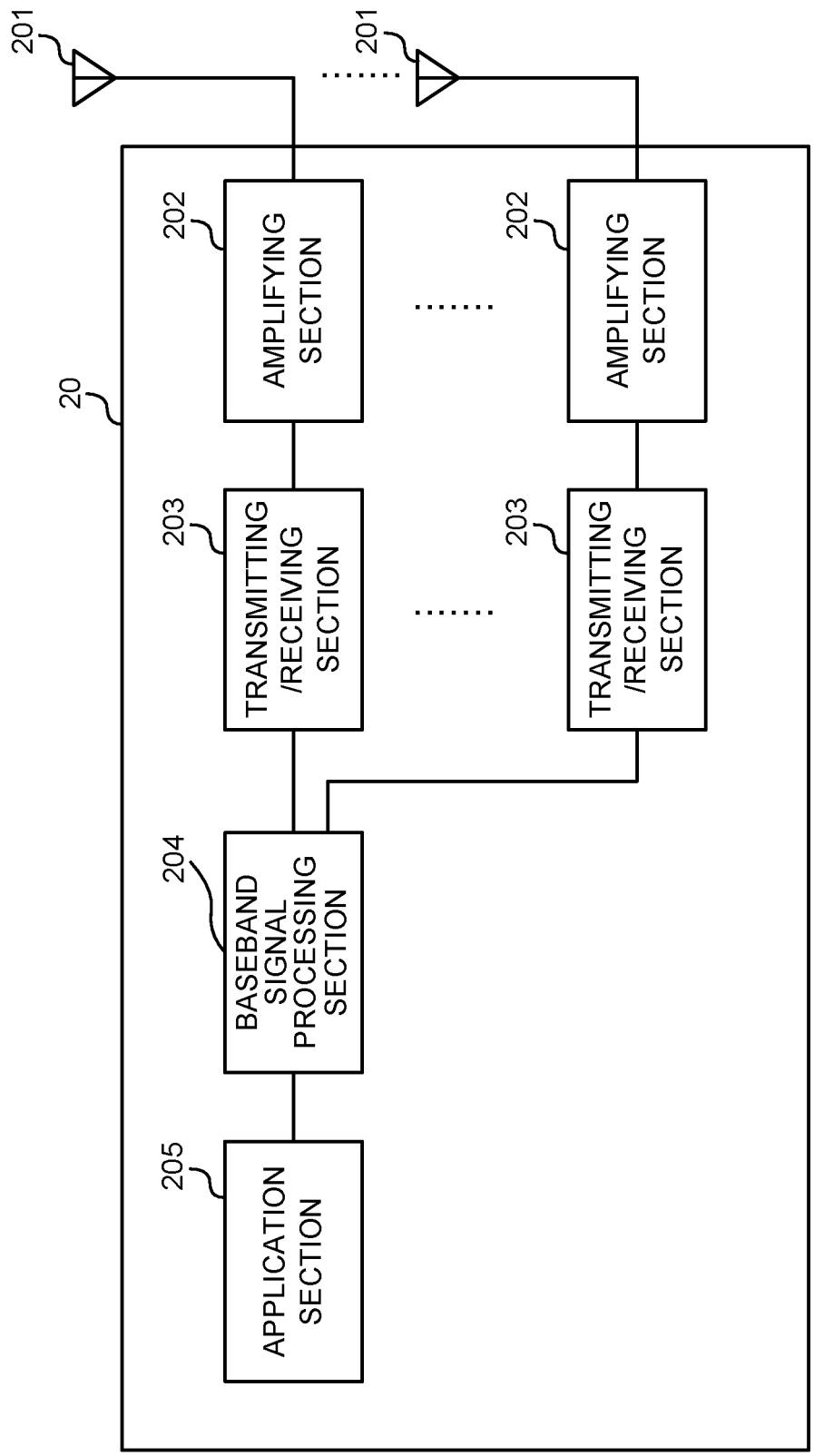
FIG. 21 is a diagram to show an example of an overall structure of a user terminal according to the present embodiment.

FIG. 21 is a diagram to show an example of an overall structure of the user terminal according to the present embodiment. A user terminal 20 includes a plurality of transmitting/receiving antennas 201 for MIMO communication, amplifying sections 202, transmitting/receiving sections 203, a baseband signal processing section 204 and an application section 205.

Radio frequency signals that are received in the plurality of transmitting/receiving antennas 201 are amplified in respective amplifying sections 202. The transmitting/receiving sections 203 receive the DL signals amplified in the amplifying sections 202. The transmitting/receiving sections 203 convert the received signals into baseband signals through frequency conversion, and output the baseband signals to the baseband signal processing section 204.

The baseband signal processing section 204 performs, on each input baseband signal, an FFT process, error correction decoding, a retransmission control receiving process, and so on. The DL data is forwarded to the application section 205. The application section 205 performs processes related to higher layers above the physical layer and the MAC layer, and so on. Broadcast information is also forwarded to the application section 205.

Meanwhile, the UL data is input from the application section 205 to the baseband signal processing section 204. The baseband signal processing section 204 performs a retransmission control transmission process (for example, an HARQ transmission process), channel coding, rate matching, puncturing, a discrete Fourier transform (DFT) process, an IFFT process and so on, and the result is forwarded to the transmitting/receiving sections 203. UCI is also subjected to at least one of channel coding, rate matching, puncturing, a DFT process, and an IFFT process, and is forwarded to the transmitting/receiving sections 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

The transmitting/receiving sections 203 receive DL signals (including at least one of a DL data signal, a DL control signal (DCI), a DL reference signal, and system information (for example, RMSI, SIBs, MIBs)) for the user terminals 20, and transmit UL signals (including at least one of a UL data signal, a UL control signal, and a UL reference signal) from the user terminals 20.

The transmitting/receiving sections 203 transmit UCI to the radio base station 10 by using an uplink shared channel (for example, a PUSCH) or an uplink control channel (for example, a short PUCCH and/or a long PUCCH).

The transmitting/receiving sections 203 may transmit uplink control information by using an uplink control channel. The transmitting/receiving sections 203 may receive system information (for example, RMSI) including index value(s) of one or more resources (PUCCH resources) for the uplink control channel. The transmitting/receiving sections 203 may receive downlink control information (downlink control channel) including index value(s) (for example, ARI(s)) indicating one or more resources for the uplink control channel.

The transmitting/receiving sections 203 can be constituted with transmitters/receivers, transmitting/receiving circuits or transmitting/receiving apparatus that can be described based on general understanding of the technical field to which the present invention pertains. Further, each transmitting/receiving section 203 may be structured as a transmitting/receiving section in one entity, or may be constituted with a transmitting section and a receiving section.

Figure 22:
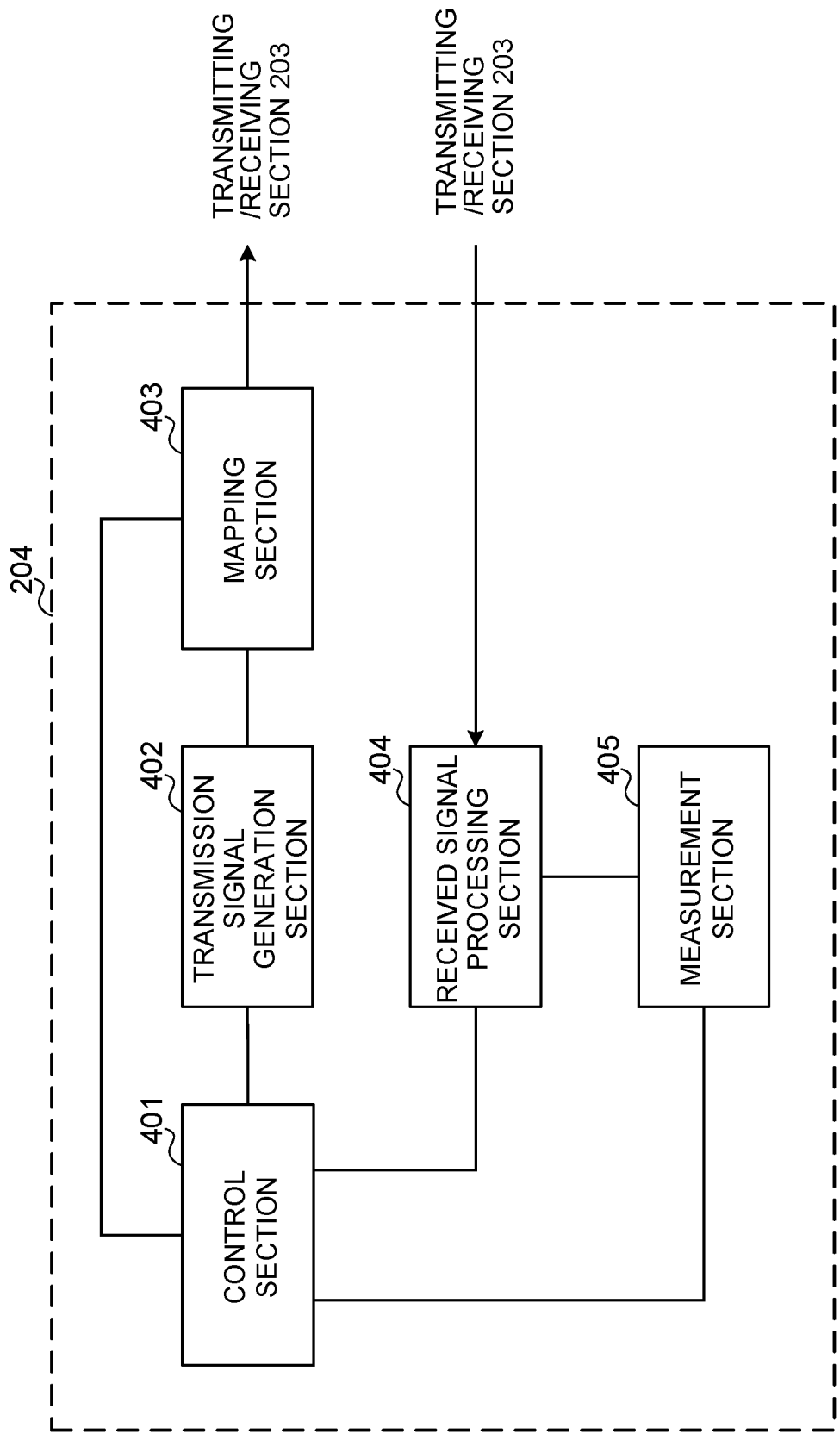
FIG. 22 is a diagram to show an example of a functional structure of the user terminal according to the present embodiment.

FIG. 22 is a diagram to show an example of a functional structure of the user terminal according to the present embodiment. Note that FIG. 22 primarily shows functional blocks that pertain to characteristic parts of the present embodiment, and it is assumed that the user terminal 20 includes other functional blocks that are necessary for radio communication as well. As shown in FIG. 22, the baseband signal processing section 204 provided in the user terminal 20 includes a control section 401, a transmission signal generation section 402, a mapping section 403, a received signal processing section 404 and a measurement section 405.

The control section 401 controls the whole of the user terminal 20. The control section 401, for example, controls the generation of UL signals in the transmission signal generation section 402, the mapping of UL signals in the mapping section 403, the DL signal receiving processes in the received signal processing section 404, and the measurements in the measurement section 405.

The control section 401 controls an uplink control channel used for transmission of UCI from the user terminals 20, based on an explicit indication from the radio base station 10 or implicit determination of the user terminals 20.

The control section 401 may control a configuration (format) of the uplink control channel (for example, a long PUCCH and/or a short PUCCH). The control section 401 may control the format of the uplink control channel, based on control information from the radio base station 10. The control section 401 may control a PUCCH format (format of the uplink control channel) used for transmission of UCI, based on information related to a fallback.

The control section 401 may determine PUCCH resources to be used for transmission of UCI, based on at least one of information via higher layer signaling, downlink control information, and an implicit value.

Specifically, when the control section 401 transmits UCI by using an uplink control channel before RRC (Radio Resource Control) connection setup, the control section 401 may determine resources for the uplink control channel to be used for transmission of the UCI, based on an index in system information (for example, RMSI).

For example, the control section 401 may determine resources for transmission of the uplink control information, based on at least one of a bit value and an implicit value in downlink control information, from among one or more PUCCH resources indicated by the index value included in the system information.

The control section 401 may determine frequency resources for an uplink control channel to be used for frequency hopping within the certain bandwidth, based on a value based on a certain bandwidth or a cell-specific PRB offset (first offset value) being 0.

The certain bandwidth may be a certain number of physical resource blocks constituting an initial access BWP (a bandwidth part used for initial access of the user terminal 20).

The cell-specific PRB offset value may have two values or four values. The control section 401 may determine whether the cell-specific PRB offset value has two values or the four values, based on at least one of a specification (table determined in advance), a period of the uplink control channel, and the certain bandwidth.

The control section 401 may determine the frequency resources for the uplink control channel, based on a cell-specific PRB offset value and a UE-specific PRB offset value (second offset value) that is indicated by at least one of an index value and an implicit value in downlink control information.

The control section 401 may control acquisition of PUCCH resources from a table (for example, FIGS. 3, 8, and 9) stored in a storage section, based on an index value in system information (for example, an RMSI index). The control section 401 may control acquisition of PUCCH resources from a table (for example, FIGS. 2A, 2B, 10A, and 10B) stored in a storage section, based on an index value in DCI (for example, an ARI).

The control section 401 may determine an initial cyclic shift index for an uplink control channel, based on a downlink control channel. A difference between a plurality of initial cyclic shift indexes (initial CS indexes corresponding to r=0 and 1) based on a plurality of downlink control channels (for example, PDCCH CCE indexes) may be different depending on a format of an uplink control channel (for example, PF 0 and PF 1).

A difference between two initial cyclic shift indexes corresponding to a certain format of an uplink control channel (for example, PF 1) may be a maximum value (for example, corresponding to 6 or phase rotation r) (second aspect).

The control section 401 may apply a certain orthogonal sequence to an uplink control channel, or may not apply an orthogonal sequence to the uplink control channel (second aspect).

The control section 401 may apply an orthogonal sequence to an uplink control channel. The control section 401 may determine an orthogonal sequence (for example, an orthogonal sequence index i), based on at least one of a downlink control channel (for example, a PDCCH CCE index) and a length of the orthogonal sequence (for example, $N_{SF}$) (fourth aspect).

The control section 401 may determine whether or not to perform frequency hopping of an uplink control channel, based on at least one of an index value and a frequency range (third aspect).

The control section 401 can be constituted with a controller, a control circuit or control apparatus that can be described based on general understanding of the technical field to which the present invention pertains.

The transmission signal generation section 402 generates (for example, coding, rate matching, puncturing, modulation, and so on) UL signals (including a UL data signal, a UL control signal, a UL reference signal, and UCI) based on commands from the control section 401, and outputs the UL signals to the mapping section 403. The transmission signal generation section 402 can be constituted with a signal generator, a signal generation circuit or signal generation apparatus that can be described based on general understanding of the technical field to which the present invention pertains.

The mapping section 403 maps the UL signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of DL signals (a DL data signal, scheduling information, a DL control signal, a DL reference signal). The received signal processing section 404 outputs information received from the radio base station 10 to the control section 401. The received signal processing section 404, for example, outputs broadcast information, system information, higher layer control information via higher layer signaling such as RRC signaling, physical layer control information (L1/L2 control information) and so on to the control section 401.

The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The measurement section 405 measures a channel state based on a reference signal (for example, a CSI-RS) from the radio base station 10, and outputs measurement results to the control section 401. Note that the measurement of the channel state may be performed for each CC.

The measurement section 405 can be constituted with a signal processor, a signal processing circuit, a signal processing apparatus, a measurer, a measurement circuit or measurement apparatus that can be described based on general understanding of the technical field to which the present invention pertains.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 23:
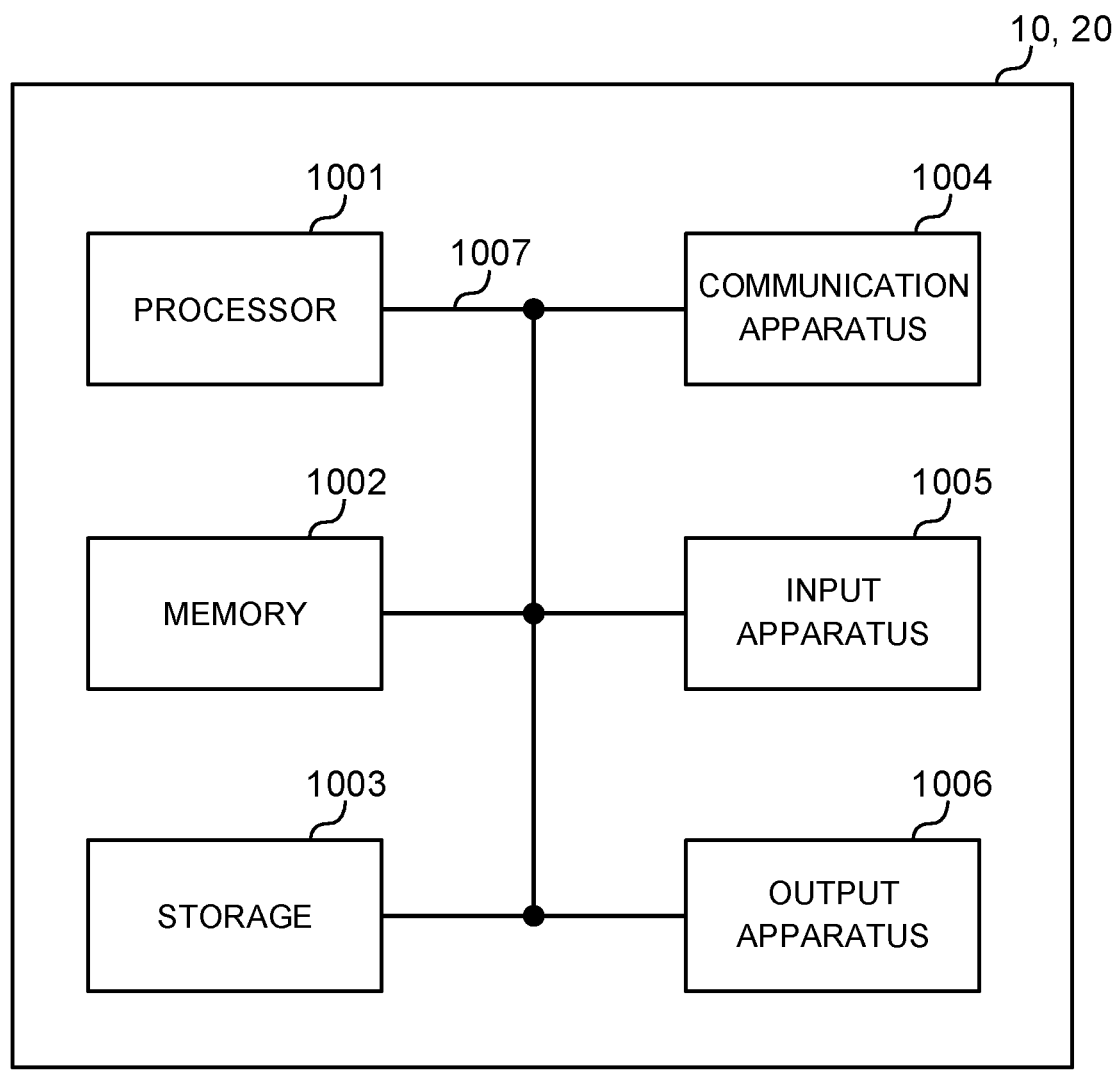
FIG. 23 is a diagram to show an example of a hardware structure of the radio base station and the user terminal according to the present embodiment.

For example, a radio base station, a user terminal, and so on according to one embodiment of the present invention may function as a computer that executes the processes of the radio communication method of the present invention. FIG. 23 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (PRB (Physical RB))," a "sub-carrier group (SCG)," a "resource element group (REG), "a" PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification may be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "reception point," "transmission/reception point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

A base station and/or a mobile station may be referred to as a "transmitting apparatus," a "receiving apparatus," and so on.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
   a receiver that receives a system information including an index; and
   a processor that
      determines a parameter set corresponding to a value of the index from a plurality of cell-specific parameter sets for a physical uplink control channel (PUCCH) before radio resource control (RRC) connection, and
      determines an initial cyclic shift index from the determined parameter set based on a physical downlink control channel (PDCCH),
   wherein the plurality of cell-specific parameter sets includes a first parameter set having an initial cyclic shift index set {0,3} for PUCCH format 0, and a second parameter set having an initial cyclic index set {0,6} for PUCCH format 1.

2. The terminal according to claim 1, wherein if the determined parameter set is one of the first parameter set and the second parameter set, then the initial cyclic shift index depends on a control channel element (CCE) index for the PDCCH, and does not depend on a PUCCH resource indicator field value in the PDCCH.

3. The terminal according to claim 2, wherein if the determined parameter set is one of the first parameter set and the second parameter set, then physical resource block (PRB) indexes in a first hop and in a second hop of the PUCCH depend on the PUCCH resource indicator field value, and do not depend on the CCE index.

4. The terminal according to claim 3, wherein the PRB index in the first hop is at a PRB offset away from a first end of an initial uplink bandwidth part, and the PRB index in the second hop is at the PRB offset away from a second end of the initial uplink bandwidth part,
   wherein the PRB offset depends on the PUCCH resource indicator field value, and does not depend on the CCE index.

5. The terminal according to claim 1, wherein the processor uses frequency hopping in transmission of the PUCCH.

6. The terminal according to claim 1, wherein the processor uses an orthogonal cover code with index 0 for the PUCCH, which uses PUCCH format 1.

7. The terminal according to claim 2, wherein the processor uses frequency hopping in transmission of the PUCCH.

8. The terminal according to claim 3, wherein the processor uses frequency hopping in transmission of the PUCCH.

9. The terminal according to claim 2, wherein the processor uses an orthogonal cover code with index 0 for the PUCCH, which uses PUCCH format 1.

10. The terminal according to claim 3, wherein the processor uses an orthogonal cover code with index 0 for the PUCCH, which uses PUCCH format 1.

11. The terminal according to claim 4, wherein the processor uses an orthogonal cover code with index 0 for the PUCCH, which uses PUCCH format 1.

12. A base station comprising:
 a processor that determines a parameter set from a plurality of cell-specific parameter sets for a physical uplink control channel (PUCCH) before radio resource control (RRC) connection, and determines an initial cyclic shift index from the determined parameter set; and
 a transmitter that transmits system information including an index corresponding to the determined parameter set, and transmits a physical downlink control channel (PDCCH) based on the initial cyclic shift index,
 wherein the plurality of cell-specific parameter sets includes a first parameter set having an initial cyclic shift index set {0,3} for PUCCH format 0, and a second parameter set having an initial cyclic index set {0,6} for PUCCH format 1.

* * * * *